(12) United States Patent
Harmon et al.

(10) Patent No.: US 11,579,590 B2
(45) Date of Patent: Feb. 14, 2023

(54) WIRELESS MOBILE WORK MACHINE COMPONENT DETECTION AND CONTROL SYSTEM

(71) Applicant: Deere & Company, Moline, IL (US)

(72) Inventors: Andrew W. Harmon, Davenport, IA (US); Robert T. Casper, Davenport, IA (US); Elijah B. Garner, Bettendorf, IA (US)

(73) Assignee: Deere & Company, Moline, IL (US)

( * ) Notice: Subject to any disclaimer, the term of this patent is extended or adjusted under 35 U.S.C. 154(b) by 345 days.

(21) Appl. No.: 16/783,440

(22) Filed: Feb. 6, 2020

(65) Prior Publication Data
US 2021/0132588 A1     May 6, 2021

Related U.S. Application Data

(60) Provisional application No. 62/928,667, filed on Oct. 31, 2019.

(51) Int. Cl.
| | | |
|---|---|---|
| *G05B 19/4155* | (2006.01) | |
| *A01C 23/00* | (2006.01) | |
| *G06K 7/10* | (2006.01) | |

(52) U.S. Cl.
CPC ........ *G05B 19/4155* (2013.01); *A01C 23/007* (2013.01); *G06K 7/10366* (2013.01);
(Continued)

(58) Field of Classification Search
CPC ...... G05B 19/4155; G05B 2219/45017; A01C 23/007; A01C 7/105; A01C 7/00;
(Continued)

(56) References Cited

U.S. PATENT DOCUMENTS

| | | |
|---|---|---|
| 4,059,161 A | 11/1977 | Smith et al. |
| 4,483,401 A | 11/1984 | Robertson |
| | (Continued) | |

FOREIGN PATENT DOCUMENTS

| | | |
|---|---|---|
| CA | 2023798 C | 3/1994 |
| CA | 2695738 A1 | 6/2010 |
| | (Continued) | |

OTHER PUBLICATIONS

Application and Drawings for U.S. Appl. No. 17/194,736, filed Mar. 8, 2021, 62 pages.

(Continued)

*Primary Examiner* — Peter D Nolan
*Assistant Examiner* — Anwar Mohamed
(74) *Attorney, Agent, or Firm* — Christopher J. Volkmann; Kelly, Holt & Christenson, PLLC

(57) ABSTRACT

A mobile work machine includes a wireless communication system configured to receive a wireless communication signal from a transmitter corresponding to a machine component on the mobile work machine, machine component identification logic configured to obtain a machine component identifier, that uniquely identifies the machine component, based on the wireless communication signal, operation detection logic configured to detect a machine operation associated with the machine component and to generate component performance data correlated to the machine component based on the machine operation, and control signal generator logic configured to generate a control signal that controls the mobile work machine based on the component performance data.

17 Claims, 20 Drawing Sheets

(52) U.S. Cl.
CPC .............. *G05B 2219/45017* (2013.01); *G05D 2201/0201* (2013.01)

(58) Field of Classification Search
CPC ................ A01C 7/12; G06K 7/10366; G05D 2201/0201; A01D 41/127; A01M 7/00; E02F 9/268; A01B 79/005; A01B 71/02
See application file for complete search history.

(56) References Cited

U.S. PATENT DOCUMENTS

| | | | |
|---|---|---|---|
| 5,050,372 | A | 9/1991 | Heiskell |
| 5,076,180 | A | 12/1991 | Schneider |
| 5,507,351 | A | 4/1996 | Martin |
| 7,409,916 | B2 | 8/2008 | Fry et al. |
| 9,781,877 | B2 | 10/2017 | Matrangolo |
| 11,205,337 | B1 * | 12/2021 | Derscheid .......... G06K 19/0723 |
| 11,252,853 | B2 * | 2/2022 | Blackwell ............ G05D 1/0295 |
| 2016/0088786 | A1 | 3/2016 | Kornecki et al. |
| 2016/0340866 | A1 | 11/2016 | Koetz et al. |
| 2017/0298992 | A1 * | 10/2017 | Koshi .................. F16C 41/008 |
| 2018/0338409 | A1 | 11/2018 | Heathcote |
| 2019/0100309 | A1 | 4/2019 | Flood et al. |
| 2020/0070906 | A1 * | 3/2020 | Laperle ................ B62D 55/244 |
| 2020/0113126 | A1 | 4/2020 | Eising |
| 2020/0146204 | A1 | 5/2020 | Geng et al. |
| 2020/0337213 | A1 | 10/2020 | Schoeny |
| 2021/0099251 | A1 * | 4/2021 | Podlozhnyuk ..... H03M 13/1111 |
| 2021/0127552 | A1 | 5/2021 | Hubner et al. |
| 2021/0157521 | A1 * | 5/2021 | Roy ........................ G06F 3/067 |
| 2021/0173399 | A1 * | 6/2021 | Richard ................ B60W 40/12 |
| 2021/0192867 | A1 * | 6/2021 | Fang ..................... G07C 5/008 |
| 2021/0197625 | A1 * | 7/2021 | Laperle ............... G01M 17/027 |
| 2021/0339758 | A1 * | 11/2021 | Laperle ................. B62D 55/32 |

FOREIGN PATENT DOCUMENTS

| | | |
|---|---|---|
| CA | 2885452 A1 | 9/2016 |
| CA | 2889850 A1 | 10/2016 |
| CN | 205912447 U | 2/2017 |
| CN | 208191248 U | 12/2018 |
| EP | 1774844 A2 | 4/2007 |
| EP | 2055168 A1 | 5/2009 |
| EP | 2404492 A2 | 1/2012 |
| EP | 3011815 A1 | 4/2016 |
| EP | 3146828 A1 | 3/2017 |
| EP | 3257348 A1 | 12/2017 |
| FR | 2646321 A1 | 11/1990 |
| GB | 1541629 A | 3/1979 |
| WO | WO2009127066 A1 | 10/2009 |
| WO | WO 2018020310 A1 | 2/2018 |

OTHER PUBLICATIONS

Application and Drawings for U.S. Appl. No. 17/062,802, filed Oct. 5, 2020, 32 pages.
Application and Drawings for U.S. Appl. No. 62/928,667, filed Oct. 31, 2019, 36 pages.
Extended European Search Report and Written Opinion issued in European Patent Application No. 20204723.9, dated Apr. 1, 2021, in 8 pages.
Extended European Search Report and Written Opinion issued in European Patent Application No. 20204522.5, dated Mar. 17, 2021, in 9 pages.
Extended European Search Report and Written Opinion issued in European Patent Application No. 20204520.9, dated Mar. 26, 2021, in 5 pages.
Extended European Search Report and Written Opinion issued in European Patent Application No. 20204518.3, dated Sep. 9, 2021, 15 pages.
Extended European Search Report and Written Opinion issued in European Patent Application No. 20204524.1, dated Apr. 1, 2021, 8 pages.
Application and Drawings for U.S. Appl. No. 16/930,895, filed Jul. 16, 2020, 36pages.
Search Report for European Patent Application No. 22160712.0 dated Aug. 2, 2022, 9 pages.

* cited by examiner

WIRELESS MOBILE WORK MACHINE COMPONENT DETECTION AND CONTROL SYSTEM

CROSS REFERENCE TO RELATED APPLICATION

The present application is based on and claims the benefit of U.S. provisional patent application Ser. No. 62/928,667, filed Oct. 31, 2019, the content of which is hereby incorporated by reference in its entirety.

FIELD OF THE DESCRIPTION

The present description generally relates to mobile work machines. More specifically, but not by limitation, the present description relates to a component detection and control system for a mobile work machine that uses wireless communication to wirelessly detect a machine component, such as an interchangeable or replaceable wear part, and its corresponding operation on the mobile work machine.

BACKGROUND

There are many different types of mobile work machines. Those mobile work machines can include agricultural machines, construction machines, turf management machines, forestry machines, among others. Many of these pieces of mobile equipment have subsystems that are controlled by an operator and/or automatically in performing operations.

For instance, an agricultural machine can have multiple different mechanical, electrical, hydraulic, pneumatic and electro-mechanical subsystems, among others. Examples of agricultural machines include, but are not limited to, row unit planters, air seeders, sprayers, harvesters, to name a few. In other examples, construction machines are often tasked with transporting material across a worksite, or into or out of a worksite, in accordance with a worksite operation. Different worksite operations may include moving material from one location to another or leveling a worksite, etc. During a worksite operation, a variety of construction machines may be used, including articulated dump trucks, wheel loaders, graders, and excavators, among others.

The subsystems of a mobile work machine, such as an agricultural or construction machine, often have a number of subsystems with any of a variety of machine components or parts. Often, a number of these components are interchangeable or replaceable. Examples of replaceable components include parts such as wheels, tires, bearings, valves, batteries, or any of a wide variety of other types of parts that wear or deteriorate by usage over time. Many of these parts have a predefined service life or expected lifecycle (e.g., based on their manufactured design) after which the parts are to be serviced or replaced. For instance, a particular tire may have a service life defined by a certain number of miles, after which they are expected to have worn to a point that requires replacement. Similarly, meters or other mechanical components may have disks, bearings, rollers, etc. that have a service life defined by a certain number of rotations or metering cycles. In another example, a hydraulic circuit has a number of valves that each have a service life defined by hours of operation, a number of operational cycles, or otherwise.

Alternatively, or in addition, a machine component on a mobile work machine is interchangeable depending on the desired application. For instance, in the case of an example agricultural seeder or applicator, a hopper or other suitable container has one or more volumetric metering systems located at a bottom portion thereof. The volumetric metering system includes a roller that has a number of recesses located between fins or flutes and a first portion of the roller engages the particles in the hopper. The particles fall into the recess and the roller turns such that the particles are transported out of the hopper and fall into a particle feed stream. This feed stream often includes airflow that helps convey the seeds or fertilizer along a path to be distributed to the agricultural surface. A meter displacement value (MDV) or a calibration value of the roller defines the volume of material that is moved for a given rotation of the meter. Depending on the desired seeding rate, different metering rollers can be placed in the volumetric meter to achieve the seeding rate for a given meter speed (revolutions per minute) or the speed of the meter can be controlled based on the MDV for the roller(s) being utilized. In order to accommodate various different application rates and seeds, these rollers are designed to be easily changeable by an operator. Thus, the seeder can be changed from one type of application to another merely by changing out the rollers. The rollers are often color-coded such that the flow rate or application can be easily discerned by the operator. However, the control system of the tractor or planter must also know the particular roller(s) used such that flow rate can be automatically controlled. For example, the tractor control system, using seeder roller information, is able to determine how much faster or slower to rotate the rotor based on the vehicle speed over ground.

Currently, the tractor control system is provided with roller information by having the operator manually enter the roller color installed on the seeder/applicator. For modern systems, this may be as many as forty eight, or more, individual rollers on a given seeder or applicator. In the event that the operator enters the wrong color roller, the application rate for that roller will be erroneous.

Operation of a mobile work machine with incorrectly chosen parts or parts that have worn or deteriorated beyond their service life can adversely affect operation, and can result in poor machine performance and/or damage to the machine itself.

The discussion above is merely provided for general background information and is not intended to be used as an aid in determining the scope of the claimed subject matter.

SUMMARY

A mobile work machine includes a wireless communication system configured to receive a wireless communication signal from a transmitter corresponding to a machine component on the mobile work machine, machine component identification logic configured to obtain a machine component identifier, that uniquely identifies the machine component, based on the wireless communication signal, operation detection logic configured to detect a machine operation associated with the machine component and to generate component performance data correlated to the machine component based on the machine operation, and control signal generator logic configured to generate a control signal that controls the mobile work machine based on the component performance data.

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

The present description generally relates to mobile work machines. More specifically, but not by limitation, the present description relates to a component detection and control system for a mobile work machine that uses wireless communication to wirelessly detect a machine component, such as an interchangeable or replaceable wear part, and its corresponding operation on the mobile work machine.

Figure 1:
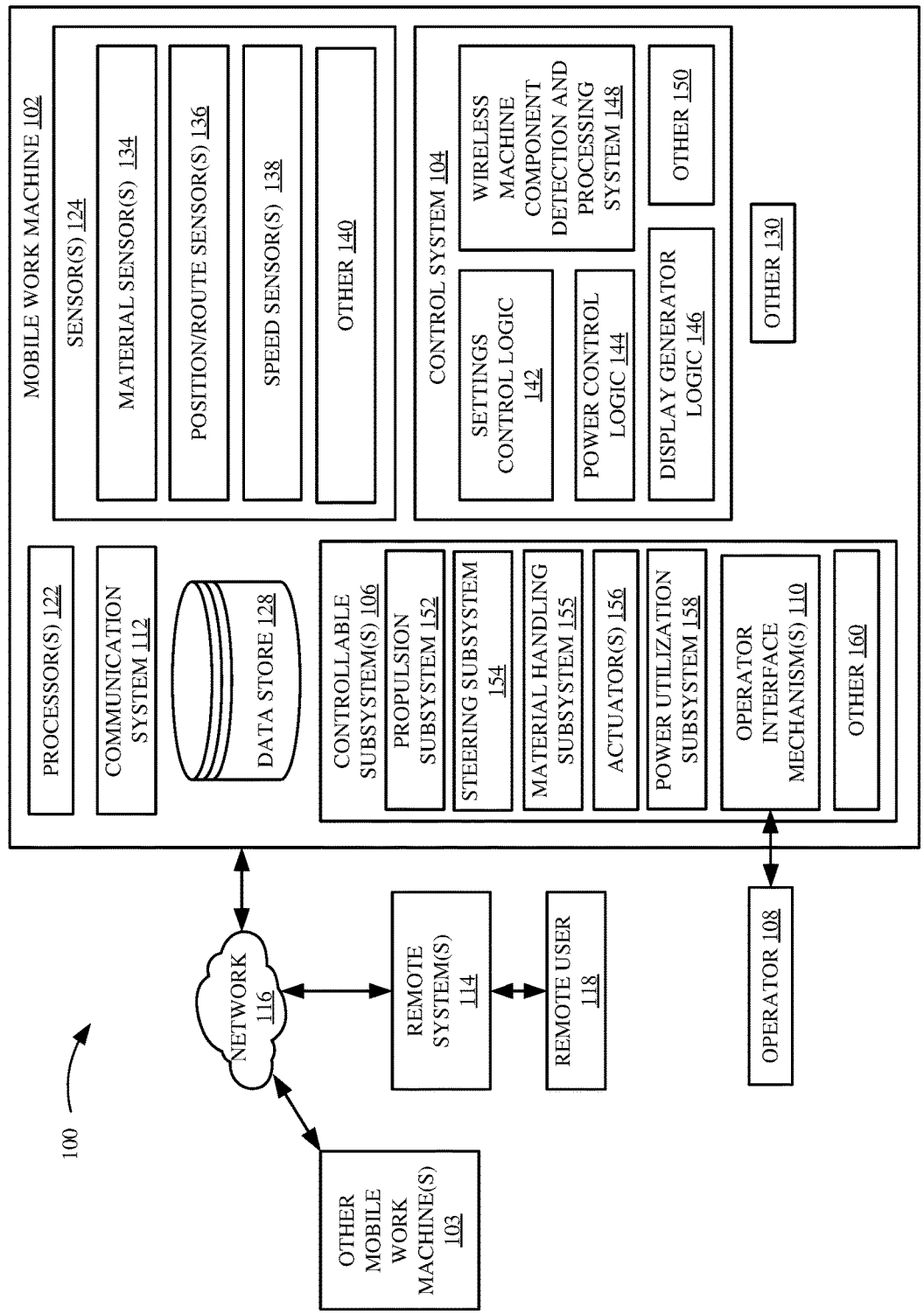
FIG. 1 is a block diagram of one example of a mobile work machine architecture.

FIG. 1 is a block diagram showing one example of a work machine architecture 100 that includes a mobile work machine 102. Work machine 102 includes a control system 104 configured to control a set of controllable subsystems 106 that perform operations on a worksite. For instance, an operator 108 can interact with and control work machine 102 through operator interface mechanism(s) 110. Operator interface mechanism(s) 110 can include such things as a steering wheel, pedals, levers, joysticks, buttons, dials, linkages, etc. In addition, they can include a display device that displays user actuatable elements, such as icons, links, buttons, etc. Where the device is a touch sensitive display, those user actuatable items can be actuated by touch gestures. Similarly, where mechanism(s) 110 includes speech processing mechanisms, then operator 108 can provide inputs and receive outputs through a microphone and speaker, respectively. Operator interface mechanism(s) 110 can include any of a wide variety of other audio, visual or haptic mechanisms.

Work machine 102 includes a communication system 112 configured to communicate with other systems or machines in architecture 100. For example, communication system 112 can communicate with other local machines, such as other machines operating on a same worksite as work machine 102. In the illustrated example, communication system 112 is configured to communicate with one or more remote systems 114 over a network 116. Network 116 can be any of a wide variety of different types of networks. For instance, it can be a wide area network, a local area network, a near field communication network, a cellular communication network, or any of a wide variety of other networks, or combinations of networks.

Communication system 112 can include wireless communication logic, which can be substantially any wireless communication system that can be used by the systems and components of machine 102 to communicate information. In one example, communication system 112 communicates over a CAN bus (or another network, such as an Ethernet network, etc.) to communicate information. This information can include the various sensor signals and output signals generated based on the sensor variables and/or sensed variables.

A remote user 118 is illustrated as interacting with remote system 114, which can be a wide variety of different types of systems. For example, remote system 114 can be a remote server environment, remote computing system that may be used by remote user 118, such as to receive communications from or send communications to work machine 102 through communication system 112. Further, it can be a remote computing system, such as a mobile device, remote network, or a wide variety of other remote systems. Remote user 118 can receive communications, such as notifications, requests for assistance, etc., from work machine 102 on a mobile device. Remote system 114 can include one or more processors or servers, a data store, and it can include other items as well.

FIG. 1 also shows that work machine 102 includes one or more processors 122, one or more sensors 124, a data store 128, and can include other items 130 as well. Sensor(s) 124 can include any of a wide variety of sensors depending on the type of work machine 102. For instance, sensors 124 can include material sensors 134, position/route sensors 136, speed sensors 138, and can include other sensors 140 as well.

Material sensors 134 are configured to sense material being moved, processed, or otherwise worked on by work machine 102. Speed sensors 138 are configured to output a signal indicative of a speed of work machine 102.

Position/route sensors 136 are configured to identify a position of work machine 102 and a corresponding route (e.g., heading) of work machine 102 as it traverses the worksite. Sensors 136 include sensors configured to generate signals indicative of an angle or turn radius of machine 102. This can include, but is not limited to, steering angle sensors, articulation angle sensors, wheel speed sensors, differential drive signals, gyroscopes, to name a few.

Control system 104 can include settings control logic 142, power control logic 144, display generator logic 146, a wireless machine component detection and processing system 148, and it can include other items 150. Controllable subsystems 106 can include propulsion subsystem 152, steering subsystem 154, material handling subsystem 155, one or more different actuators 156 that can be used to change machine settings, machine configuration, etc., power utilization subsystem 158, and it can include a wide variety of other systems 160, some of which are described below. In one example, controllable subsystems 106 include operator interface mechanism(s) 110, such as display devices, audio output devices, haptic feedback mechanisms, as well as input mechanisms. Examples are discussed in further detail below.

Settings control logic 142 can control one or more of subsystems 106 in order to change machine settings based upon objects, conditions, and/or characteristics of the worksite. By way of example, settings control logic 142 can actuate actuators 156 that change the operation of material handling subsystem 155, propulsion subsystem 152, and/or steering subsystem 154.

Power control logic 144 generates control signals to control power utilization subsystem 158. For instance, it can allocate power to different subsystems, generally increase power utilization or decrease power utilization, etc. These are just examples and a wide variety of other control systems can be used to control other controllable subsystems in different ways as well.

Display generator logic 146 illustratively generates a control signal to control a display device, to generate a user interface display for operator 108. The display can be an interactive display with user input mechanisms for interaction by operator 108.

As noted above, mobile work machine 102 can take a wide variety of different forms. For example, mobile work machine 102 can include a construction machine, such as a bulldozer, motor grader, crane, front loader, excavator, dump truck, to name a few. In another example, mobile work machine 102 can include an agricultural machine, such as a tractor, combine, planter, seeder, sprayer, to name a few.

Figure 2:
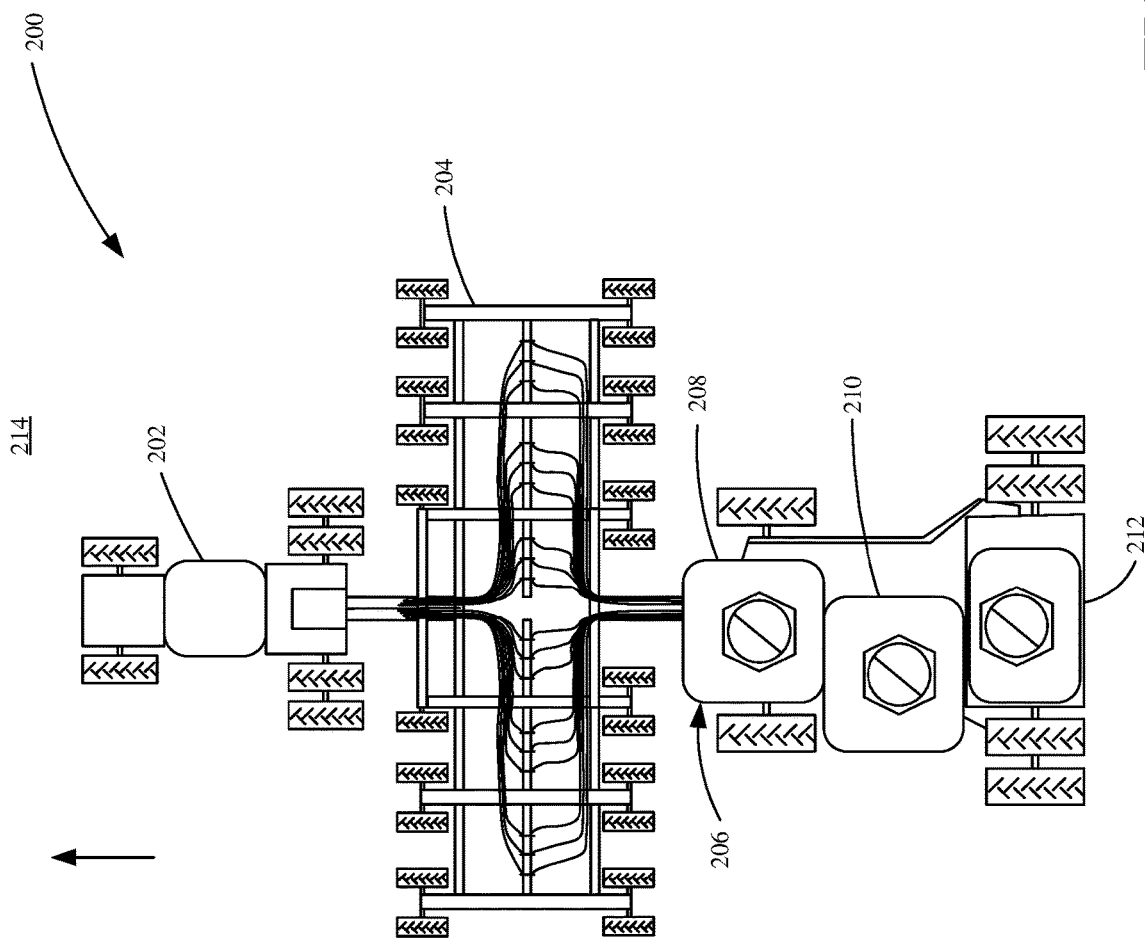
FIG. 2 is a top plan view of an example agricultural environment.

FIG. 2 is a diagrammatic top plan view of an agricultural environment in which embodiments described herein are applicable. As shown in FIG. 2, environment 200 includes a tractor 202 coupled to a seeder, such as an air seeder 204, which is coupled to a commodity cart 206. These couplings typically include mechanical, hydraulic, and electrical couplings. Accordingly, the operator of tractor 202 can make various adjustments to operation of seeder 204 and commodity cart 206. As tractor 202 pulls seeder 204 and commodity cart 206, solid particles within commodity hoppers 208, 210, or 212, are fed into respective volumetric metering systems and conveyed in one or more commodity lines to seeder 204 for application to the agricultural surface, such as field 214.

Figure 3:
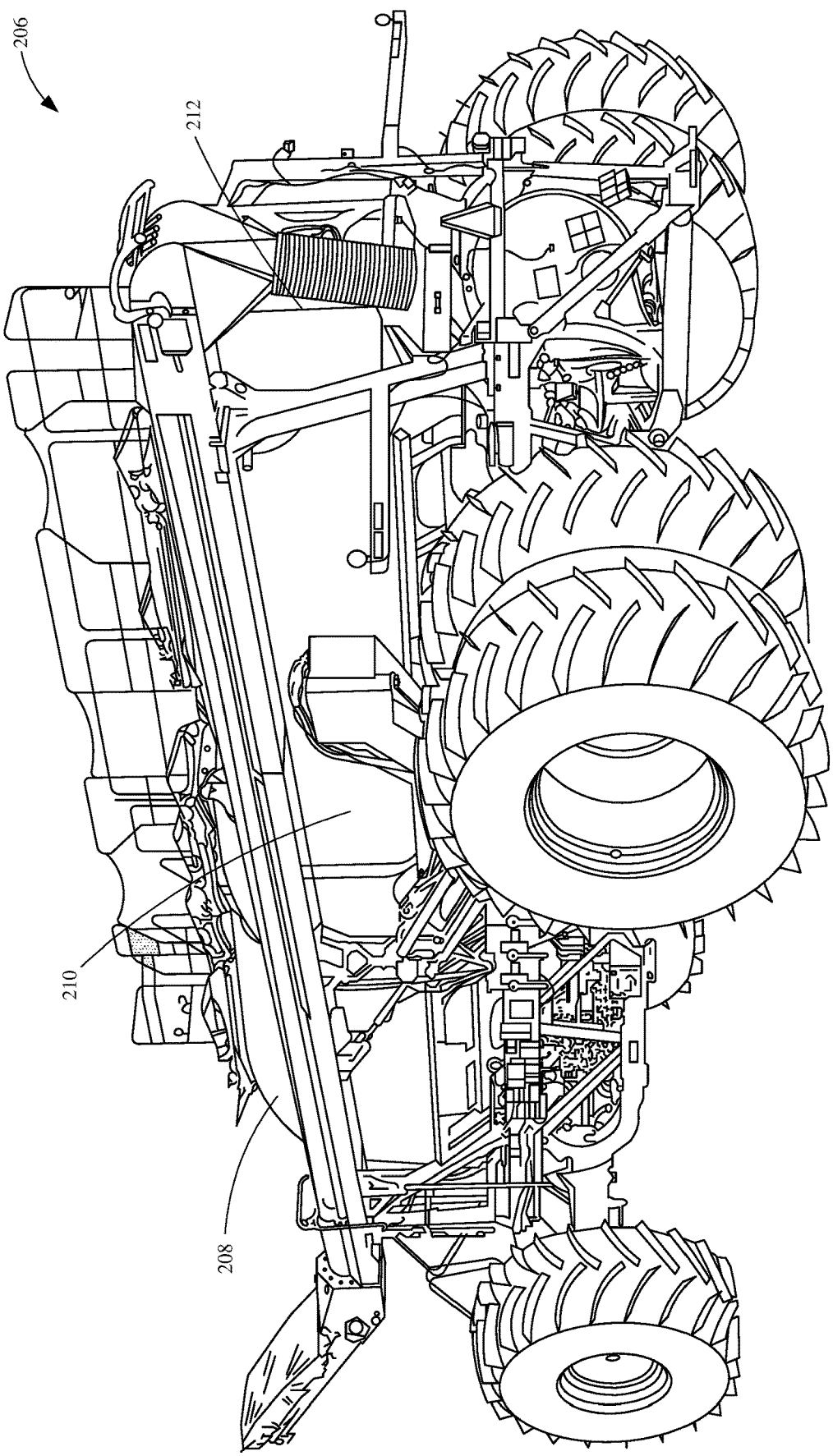
FIG. 3 is a perspective view of an example agricultural commodity cart carrying a plurality of hoppers and associated volumetric metering systems.

FIG. 3 is a perspective view of one example of the commodity cart 206 shown in FIG. 2. As shown in FIG. 2, commodity cart 206 includes commodity hoppers 208, 210, and 212. Disposed at a bottom location of each respective hopper is a volumetric metering system that is configured, by virtue of selection of a volumetric roller, to provide a controlled feed of solid particles within the respective hoppers.

Figure 4:
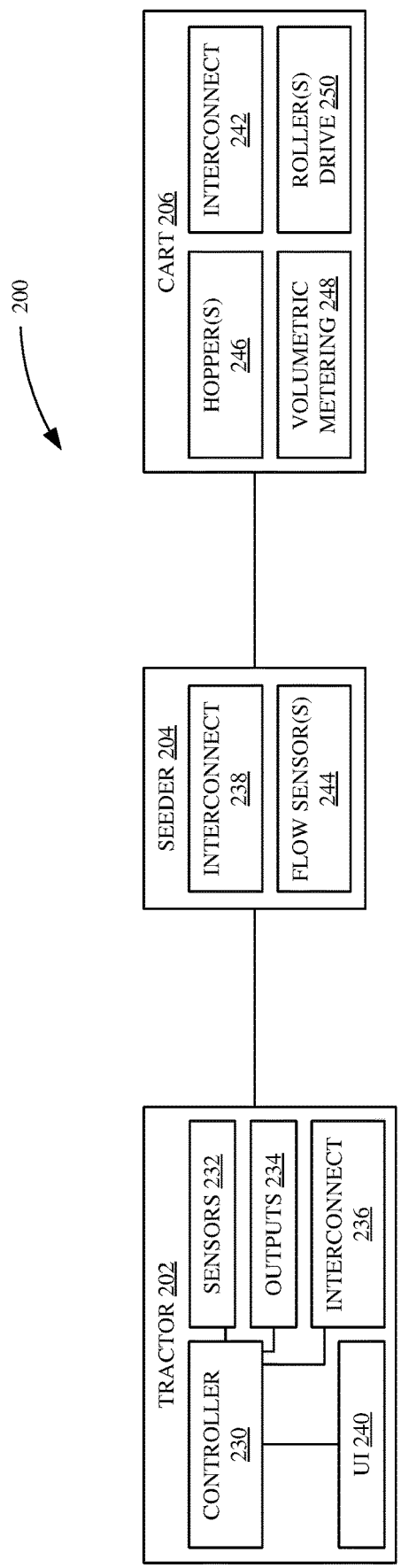
FIG. 4 is a block diagram of example electrical interconnections of the environment shown with respect to FIG. 2.

FIG. 4 is a diagrammatic view of one example of electrical connections within environment 200. As shown, tractor 202 includes one or more controllers 230 that are coupled to a variety of tractor sensors 232 and tractor outputs 234. Additionally, tractor 202 includes an electrical interconnect 236 that is configured to couple to electrical interconnect 238 of seeder 204. Additionally, tractor 202 includes a user interface 240 coupled to controller(s) 230 in order to allow an operator located within the cab of tractor 202 to interact with the control system of the tractor 202, seeder 204, and commodity cart 206.

Electrical interconnect 238 of seeder 204 also facilitates the electrical connection between tractor 202 and commodity cart 206 via electrical interconnect 242 of commodity cart 206. Further, seeder 204 may include one or more suitable sensors 244 that sense the delivery of commodity, such as seeds or fertilizer, to the agricultural surface. These sensors 244 may be flow sensors or any suitable sensors that may provide an indication of the effective delivery of the commodity to the agricultural surface.

Commodity cart 206 includes commodity hoppers 208, 210, and 212, as illustrated diagrammatically at reference numeral 246, each hopper is coupled to a respective volumetric metering system 248 that employs a removable roller coupled to a roller drive 250, which is operably coupled to tractor output 234 in order to transport a controlled amount of commodity from the hopper to a commodity feed stream delivered to seeder 204.

Referring again to FIG. 1, wireless machine component detection and processing system 148 generally provide automatic identification of components that are coupled to, or otherwise operational with, mobile work machine 102. Examples of components include components or parts installed on one or more of subsystems 106.

System 148 is configured to wirelessly identify the specific parts, upon their installation, using unique identifiers and to correlate operational data to those uniquely identified parts. Usage of the parts can be tracked across different operations of a same work machine (e.g., usage of the component by machine 102 on different worksites or projects), as well as across different machines (e.g., usage of the component by machines 102, 103, etc.).

Further, system 148 can identify component service life or lifecycle information, and can detect or estimate wear or deterioration of those components by usage over time. Such information can be used to automatically control the mobile work machine environment, such as by controlling the operation of the system(s) having those parts, sending replacement notifications indicating that the parts require replacement, or otherwise.

Figure 5:
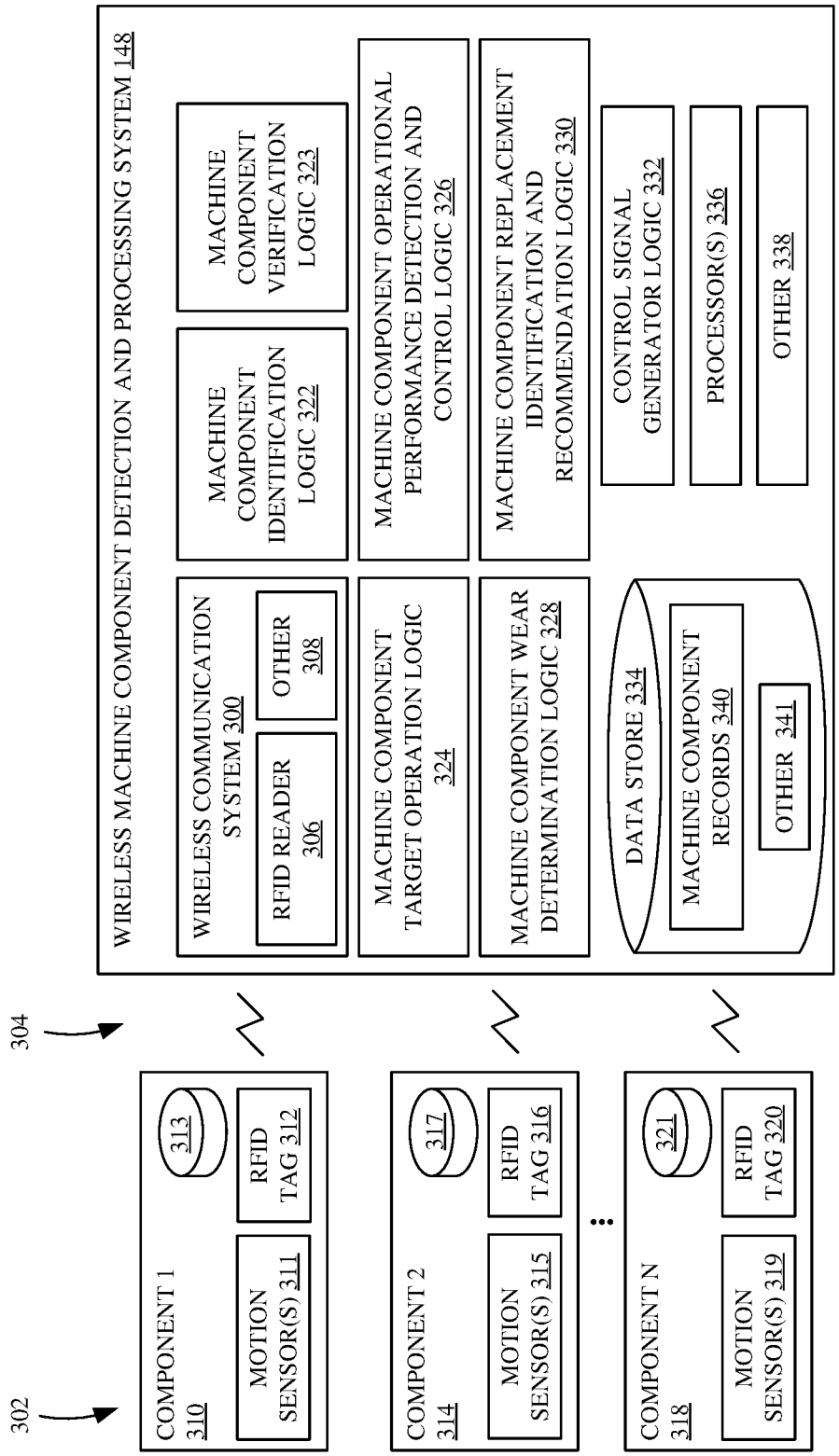
FIG. 5 is a block diagram of one example of a wireless machine component detection and processing system.

FIG. 5 is a block diagram showing one example of wireless machine component detection and processing system 148. As discussed in further detail below, system 148 is configured to perform automatic identification, through a wireless connection, of machine components that are coupled to or otherwise used by mobile work machine 102.

System 148 includes a wireless communication system 300 configured to wirelessly communicate with a set of machine components 302 through a wireless communication channel 304. Channel 304 can comprise any suitable type of wireless communication channel. In one example, system 300 communicates with components 302 using electromagnetic radiation, such as radio frequency (RF) channels. One example includes Bluetooth communication. In another example, system 300 utilizes near field communication (NFC) or other radio-frequency identification technology (e.g., RFID).

For the sake of the present discussion, but not by limitation, system 300 will be described in the context of RF identification that identifies and tracks RFID tags corresponding to components 302. Accordingly, system 300 includes an RFID reader 306, and can include other items 308 as well. RFID reader 306 is configured to identify RFID tags that are embedded in, or otherwise attached to, components 302. Illustratively, a first component 310 includes an RFID tag 312, and a second component 314 includes an RFID tag 316. It is noted that components 302 can include any number of components, as represented by component N 318 and its associated RFID tag 320. Each RFID tag (e.g., tags 312, 316, 320) encodes information that uniquely identifies the corresponding machine component (e.g., components 310, 314, 318).

As noted above, machine components 302 can include any of a wide variety of different types of components. For example, they can include interchangeable or replaceable wear parts. These can include parts of controllable subsystems 106, or other systems on or associated with machine 102.

For sake of illustration, in one example agricultural environment, component 310 comprises a removable roller of a volumetric meter (e.g., volumetric metering system 500 discussed below with respect to FIG. 7) in material handling subsystem 155 and component 314 comprises a tire of propulsion subsystem 152. Also, in an air seeder example, an air source, such as a blower, can include RFID tags on the corresponding motor(s), blades, etc. These of course, are for sake of illustration only.

An example RFID tag comprises a passive tag that collects energy from interrogating radio waves of RFID reader 306 and, using this collected energy, transmits a response that is read by RFID reader 306. This response can include information such as an encoded identifier that it uniquely identifies the RFID tag and/or machine component, information about the machine component, and/or historical operational data for the machine component. For instance, the encoded information can include a manufacture date of the machine component, a part or serial number of the machine component, service life information indicative of usage history of the machine component, or any other information.

In one example, RFID reader 306 is positioned so that it automatically detects the RFID tag of the corresponding component upon coupling of the component to its corresponding subsystem. To illustrate, an example passive RFID system reads at a short distance of a few feet or less. In the case of a metering roller in such a passive system, one or more RFID readers are placed on or in close proximity to the volumetric meter such that passive RFID tags are activated only upon coupling of the metering roller to the volumetric meter. That is, reader 306 is placed at a corresponding distance so that tag 312 is activated when component 310 is placed in the volumetric meter. This can reduce the likelihood of the passive RFID tag being activated and read without the component being installed in the volumetric meter.

In another example, an RFID tag can comprise an active tag that has an on-board battery and periodically transmits its identification signal and/or encoded information. In another example, an RFID tag can comprise a battery-assisted passive tag that has an on-board battery and is activated when in the presence of RFID reader 306.

An RFID tag can be read-only, having a factory-assigned serial number that is used as a key in a database to identify the RFID tag and/or machine component. In another example, an RFID tag can be read/write where object-specific data can be written to the tag by system 300. As discussed in further detail below, lifecycle information such as runtime, cycle count, or other operational data can be written to the RFID tag.

Also, the machine component(s) can include on-board motion sensor(s) (e.g., sensors 311, 315, and 319), such as one or more accelerometers, gyroscopes, inertial measurement unites (IMUs), etc. The motion sensor(s) can be integrated with the RFID tag or can be a separate component. The motion sensor(s) communicate motion information, indicative of motion of the machine component, to system 148, either directly or through the corresponding RFID tag.

Additionally, machine component(s) 302 can include on-board data storage (e.g., data stores 313, 317, and 321). The data storage can be integrated with the RFID tag or can be a separate component that communicates with the RFID tag. The data storage can store information such as machine component identifiers, manufacturer or part number, historical operation data, lifecycle information, etc.

In the example of FIG. 5, system 148 includes machine component identification logic 322, machine component verification logic 323, machine component target operation logic 324, machine component operational performance detection and control logic 326, machine component wear determination logic 328, machine component replacement identification and recommendation logic 330, and control signal generator logic 332. System 148 is also illustrated as including a data store 334, one or more processors 336, and can include other items 338 as well.

Machine component identification logic 322 is configured to identify the specific machine components in the set of machine components 302. The identification of the particular machine component can be based on information encoded in the signal from the RFID tags embedded in or coupled to the component. Based on the signal, each machine component can be uniquely identified.

Also, the identification can be based on machine component records 340 stored in data store 334. Examples of machine component records 340 are described below with respect to FIG. 6. For instance, machine component records 340 uniquely identifies each machine component based on its corresponding tag, and can store any of a wide variety of different types of information that identifies the structural or performance characteristics of the component, as well as historical use data that can be used to indicate deterioration or wear of the component.

It is noted that the machine components represented by records 340 can include machine components that have been previously used on machine 102, machine components that are expected to be used on machine 102, and/or machine components that have been used on other machines. For example, a metering roller can be used on one air seeder during a first operation. During that first operation, the number of cycles of the roller are tracked and stored in a corresponding record. If that roller is removed, and utilized in a second, different air seeder, a second operation of the roller in the second machine can also be tracked. Thus, the lifecycle of the roller can be tracked and stored, even if the roller is used across different machines, different fields, and/or different planting seasons.

In one example, logic 322 generates machine component records 340 for the components 302, in response to detecting the RFID tags of those components. While the machine component records 340 are illustrated as being stored in data store 334 of system 148, some or all of the machine component data can be stored elsewhere. In one example, some or all of this data can be stored on the tags themselves, e.g., reader 306 transmitting the information to the tags for storage in the on-board data storage (e.g., 313, 317, 321). Alternatively, or in addition, machine component records 340 can be stored on a remote system, such as remote system 114 illustrated in FIG. 1.

Machine component verification logic 323 is configured to verify the machine components 302 and/or control operation of machine 102 based on the verification. For example, logic 323 can be configured to verify that component 310 is a valid metering roller for use in a volumetric meter of machine 102. This determination can be based on any of a wide variety of different types of information. For example, logic 323 can restrict use of volumetric metering rollers to a list of acceptable manufacturers, models, and/or configurations. Logic 323 can thus ensure that improper or other unacceptable parts are not utilized on machine 102, based on verifying the identity of the components from the embedded tags. For instance, if a metering roller is coupled to the volumetric meter and either does not have an RFID tag or has a tag that indicates a different manufacturer, model, etc., logic 323 can provide a notification to the operator or other user, can restrict or prevent operation of the meter, and/or perform other actions.

Machine component target operation determination logic 324 is configured to determine a target operation for the machine component based on its identification from the RFID tag. This determination can be based on data encoded in the RFID tag signal, data stored in records 340, or otherwise. For instance, in the case of a metering roller, logic 324 determines an operational speed for the roller to achieve a desired seeding rate based on the MDV of the roller that is identified from the tag and/or from the corresponding record 340 for that component. Logic 324 is configured to determine a configuration or setting for machine 102 based on identification of components 302.

Machine component operational performance detection and control logic 326 is configured to detect operation of the identified components. This can include an instantaneous performance characteristic, such as a speed, temperature, pressure, or other operational characteristic of the component, as well as historical performance data. Logic 326 is configured to generate a control signal, either itself, or through operation of control signal generator logic 332, that controls machine 102. Accordingly, based on a detected operation of components 302 using the embedded RFID tags, machine 102 can be controlled in any of a number of ways. For example, system 148 can automatically control one or more of subsystems 106. For instance, system 148 can control subsystem 152, subsystem 154, subsystem 155, actuators 156, subsystem 158, mechanism(s) 110, and/or other systems 160 based on the detected operation of components 302. Alternatively, or in addition, system 148 can control communication system 112 to send an indication of the detected operation of components 302 to another system or machine (e.g., machine 103, system 114, etc.). In one example, logic 326 is controlled to write the performance data to the corresponding records 340.

Figure 6:
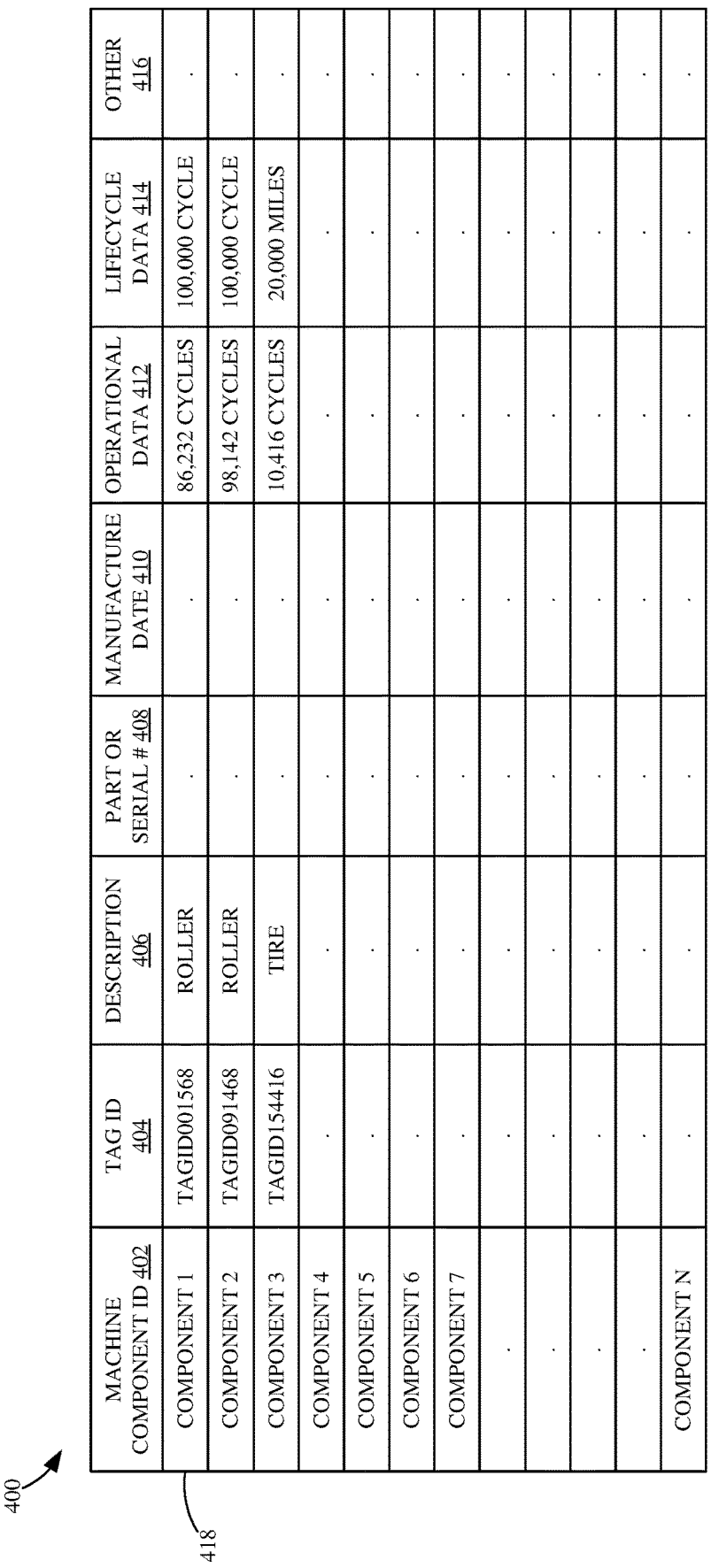
FIG. 6 illustrate one example of machine component records.

FIG. 6 illustrates one example of machine performance records 340. As shown in FIG. 6, a table or other data structure 400 includes a number of data entries, in the form of table rows. Each table row has a number of columns or fields. In the example of FIG. 6, a first column 402 stores a machine component identifier (ID), that uniquely identifies each machine component. A second column 404 identifies a tag ID from the embedded tag. In one example, the tag ID stores a unique tag serial number that uniquely identifies the tag, which is mapped to the corresponding machine component identified in column 402. A third column 406 comprises a description field that stores a description of the machine component and column 408 can store a part or serial number of the component. Column 410 stores a manufacture date for the component. Column 412 stores operational data, that is updated by logic 326 as the component is utilized on machine 102. Column 414 can store service life or lifecycle data for the component. In one example, the lifecycle data is encoded on the RFID tag, and is read by logic 322 and stored in record 340. One or more other columns 416 can store other data as well.

Referring again to FIG. 5, logic 326 can generate the operational performance data in any of a number of ways. In one example, logic 326 detects operation of component 310 based on the signal from tag 312. For example, tag 312 (or another component) on machine component 310 generates data indicative of movement of component 310. For example, motion sensor(s) 311 indicate movement of machine component 310, which can be sent by tag 312 and received by reader 306, which provides the data to logic 326. Alternatively, or in addition, logic 326 can receive sensor signals from one or more sensors (sensors 124) on machine 102. In the example of a wheel or other ground engaging traction element, RFID tag 312 can be embedded in the tire or other rotating element, and read by reader 306 to identify that particular ground engaging traction element. A signal from speed sensor 138 and/or position/route sensor 136 can indicate a distance that machine 102 has traveled, while that particular ground engaging traction element is mounted on machine 102. Using this data, logic 326 updates the corresponding machine component record 340 to indicate the number of miles (or other measure) that the ground engaging traction element has traveled. This of course, is for sake of example only.

Machine component deterioration determination logic 328 is configured to determine a level of deterioration or wear of machine components 302 based on the operational data. For example, logic 330 can compare the operational data in column 412 to the lifecycle data in column 414, to determine whether the lifecycle for the machine component has been exceeded. Based on this determination, a control signal can be generated to send or display a notification to the operator, to send a notification to another user (e.g., remote user 118 over network 116) or another machine (e.g., machine 103), and/or to automatically control machine 102, such as by changing a speed or shutting down the corresponding system that is using the machine component.

Alternatively, or in addition, deterioration or wear of a machine component can be detected based on the signal from the RFID tag. For instance, RFID tag 312 can be embedded within machine component 310 such that a threshold level of wear of component 310 will affect the signal generated by the RFID tag, which can be sensed by reader 306 and interpreted by logic 330 as indicating deterioration of component 310. For instance, where the machine component is a tire, an RFID tag can be embedded at a threshold depth (corresponding to a predefined service life) within the treads of the tire. When the tread wear approaches the threshold depth, the RFID tag is physically affected/damaged, and effectually destroyed. This can be detected by system 148. Accordingly, logic 330 can determine that the signal from RFID tag 312 has been degraded to a point that indicates that wear of component 310 is physically affecting the RFID tag. This can include an unexpected drop of the signal from the RFID tag, which can indicate that the chip has been destroyed or has fallen out of the tread of the tire, which is used as an indication that the tire should be replaced.

As noted above, one example of machine component 310 comprises a metering roller or other component of a volumetric metering system. Volumetric metering systems are used in the agricultural industry to apply a controlled amount of solid particles (see e.g., seed or fertilizer) to an agricultural surface such as a crop or a field. As can be appreciated, when applying such materials, it is very important to apply the correct amount per acre. Over-seeding can result in wasted product, while under-seeding can result in lower yields per acre than the field could otherwise support. For fertilizer, over-application can result in damage to the product, while under-application can reduce the efficacy of the application. Accordingly, for each application of bulk solids to an agricultural surface, proper metering is very important. A given seeder or applicator of bulk solid materials will typically be used for a variety of different particle sizes.

In the example discussed above with respect to FIGS. 2 and 3, a hopper or other suitable container has one or more volumetric metering systems located at a bottom portion thereof. The volumetric metering system includes a roller that has a number of recesses. The particles fall into the recess and the roller turns such that the particles are transported out of the hopper and fall into a stream. In order to accommodate various different application rates and seeds, the rollers are designed to be changeable by an operator. Thus, the seeder can be changed from one type of application to another by changing out the rollers. The control system of the tractor or planter must know the particular rollers used such that the flow rate can be automatically controlled. For example, the tractor control system, using seeder roller information, is able to determine how much faster or slower to rotate the rotor based on the vehicle speed over the ground.

Figure 7:
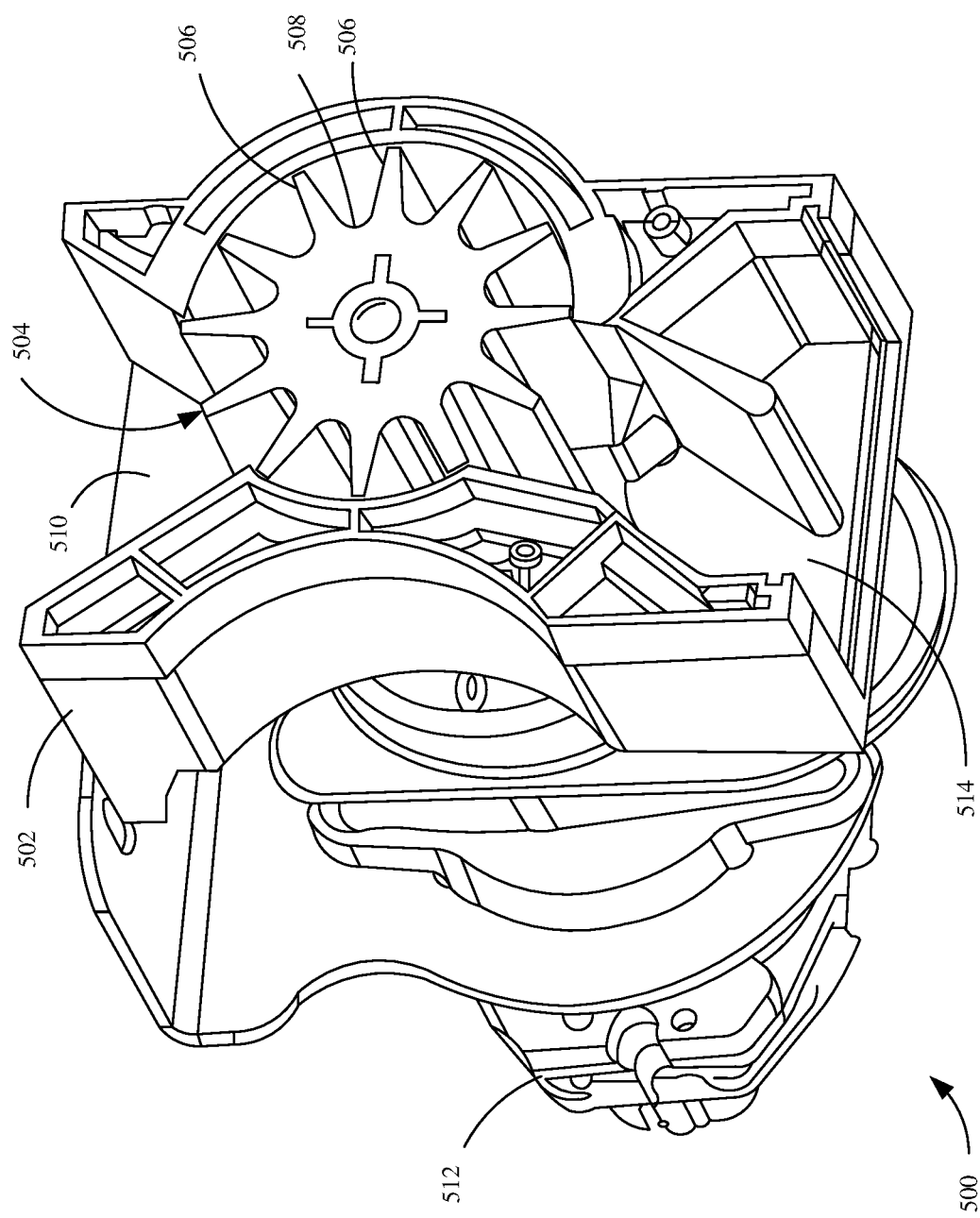
FIG. 7 is a perspective cutaway view of one example of a volumetric metering system.

FIG. 7 is a diagrammatic perspective view of one example of a volumetric metering system 500 that includes a housing 502, shown in cutaway form in FIG. 7. A roller 504 is disposed within housing 502 includes a number of flutes 506 and recesses 508 disposed between flutes 506. A first region 510 of volumetric metering system 500 is configured to contact commodity within a hopper or storage container and as such, the commodity will fall into individual recesses 508. As roller 504 is rotated by roller drive (e.g., roller drive 250), the commodity within the individual recesses 508 is transferred to region 514 where it can fall into a commodity stream. Often, the commodity stream includes an air-assisted flow stream that helps convey the commodity to a seeder, such as seeder 204. As can be appreciated, the size of the recesses 508, as well as the number of recesses disposed about roller 504 help determine the amount of commodity that can be delivered for a given rotation. Further, the width of the recesses 508 (along the axis of roller 504) also can be selected to help determine the flow rate. Accordingly, rollers 504 determine the delivery rate for the commodity. These rollers are generally color-coded in order to help operators select which rollers should be used for which purpose. For example, one roller may be red indicating that it is suitable for ultra-low rate applications or very small seed size, while a blue roller may indicate that it is suitable for ultra-high rate applications or application of relatively large seeds. Once the operator has installed the correct color rollers within the metering system(s) the operator will typically return to the cab of the tractor, such as tractor 202, and utilize a user interface (e.g., user interface 240) to inform the control system of the selected rollers. However, incorrect selection of the rollers can result in deviation of the feed rate from the desired rate.

Figure 8A:
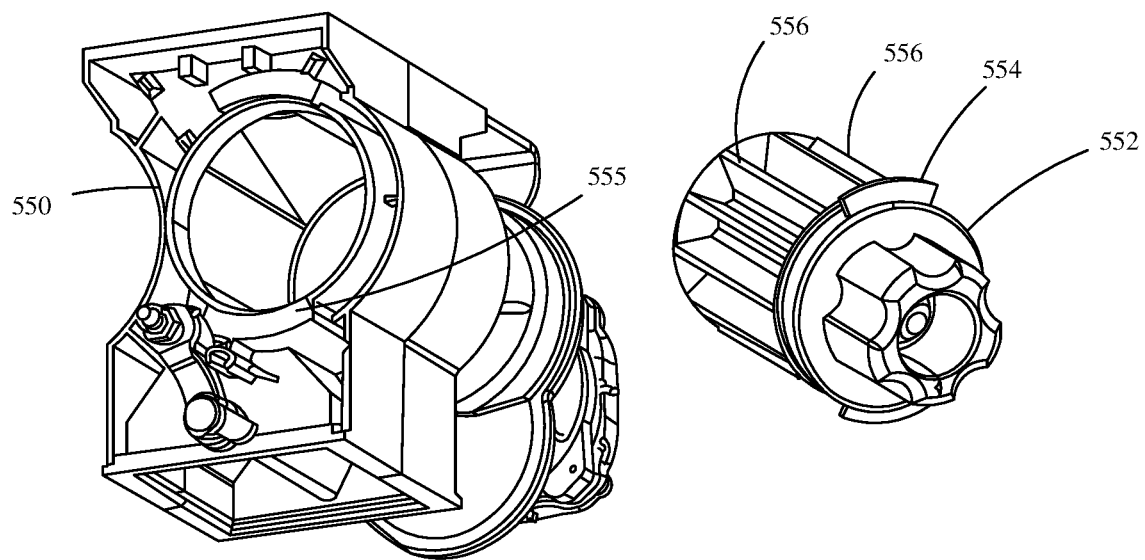
FIG. 8A-8B are diagrammatic views of one example of a volumetric metering system and roller.
Figure 8B:
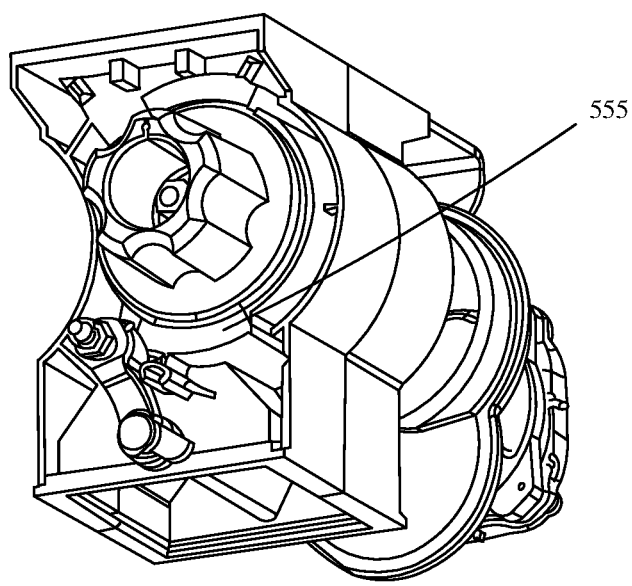

FIGS. 8A and 8B are diagrammatic views illustrating a volumetric metering system housing 550 and removable roller 552 having a wireless communication tag (e.g., RFID tag) that wirelessly transmits information to a corresponding RFID reader that is used to uniquely identify the removable roller. FIG. 8A illustrates roller 552 removed from housing 550. As illustrated, roller 552 includes a tab 554. A wireless communication tag (an RFID tag in the present example) is provided on or in tab 554. When roller 552 is installed within housing 550, as shown in FIG. 8B, tag 554 is positioned within an activation range where a corresponding RFID reader (e.g., RFID reader 306) is positioned and activates the RFID tag. The RFID reader can be positioned on housing 550, or adjacent housing 550, but within the activation range. In one example, the RFID reader is mounted at a location on housing 550 indicated by reference numeral 555. The RFID tag communicates information that not only uniquely identifies roller 552, but indicates the physical configuration of roller 552, such as the number of flutes 556, shown in FIG. 8A.

In one example, additional information may be encoded or otherwise provided by roller 552. For example, such additional information may include the date of manufacture of the roller. The additional information may also include a unique identification number for the individual roller. The additional information can also include physical property information such as roller capacity, number of recesses, roller color, etc. The additional information can also include roller behavioral information such as calibration factor, roller life, etc. In this way, the control system can be provided with the ability to track usage of that particular roller over time in order to potentially detect or forecast wear or deterioration. Further, the detection of individual rollers via wireless communication technology can provide information indicative or revolution counts as well as duty cycle collection for individual rollers.

To illustrate one particular example, assume that roller 552 was manufactured to have an MDV (meter displacement volume) value of 400. However, due to manufacturing tolerances, the particular roller 552 was manufactured with an MDV value of 399.8. This actual MDV value can be detected through water displacement testing, or otherwise, and can be coded on the RFID tag on tab 554. When roller 552 is inserted into housing 550, the RFID reader reads the RFID tag information to identify the particular roller, as well as to identify the actual MDV value of the roller. The control system identifies that the MDV value has an offset resulting from the manufacturing process (i.e., it is 399.8 instead of 400), and controls the speed of the roller to be 100.2 percent of the normal speed to effectively achieve the MDV of 400. That is, the increased rotational speed accounts for the reduced MDV of the roller.

Figure 9:
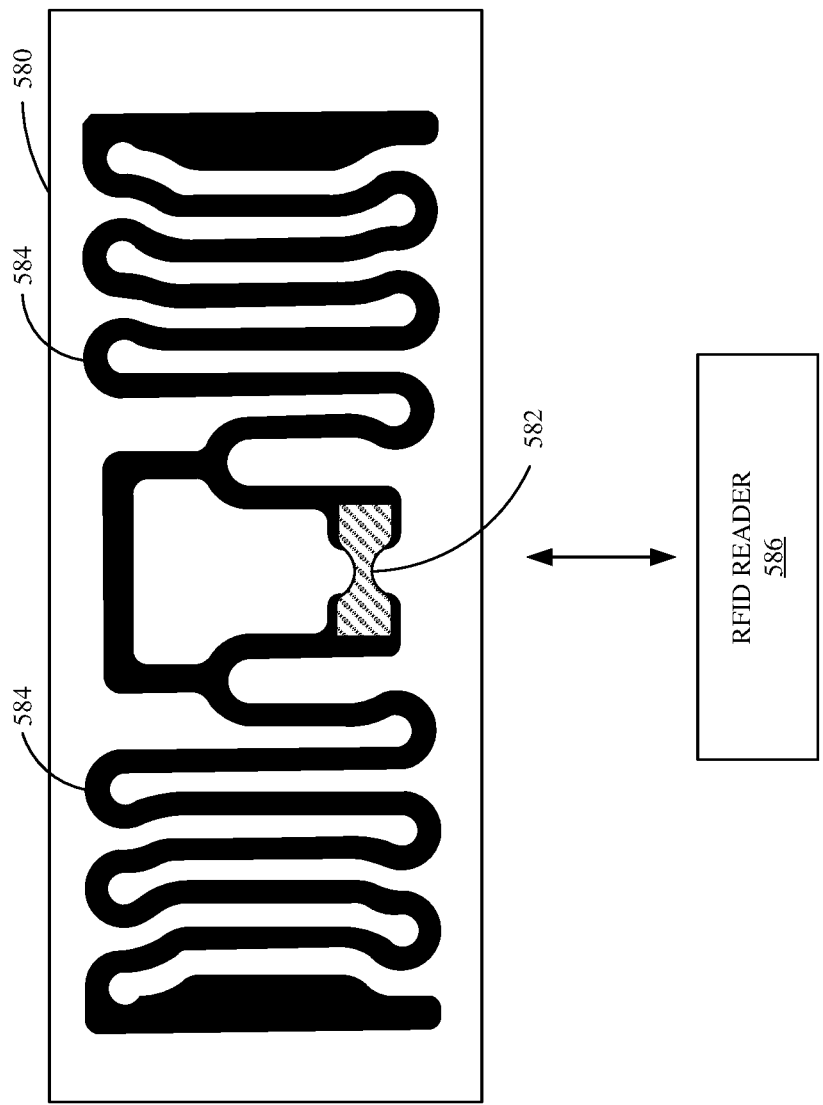
FIG. 9 is a diagrammatic view of one example of an example RFID system incorporated into a roller.

FIG. 9 is a diagrammatic view of a wireless communication system (such as an NFC system or other RFID system) incorporated into a machine component. As shown in FIG. 9, a tab 580 includes a wireless communication chip 582 coupled to a plurality of traces 584. In this way, wireless communication chip 582 and traces 584 are able to interact with a suitable wireless communication receiver (such as an RFID reader), illustrated at reference numeral 586. While FIG. 9 shows wireless communication reader 586 as potentially positioned within a transducer portion of a housing, it is also expressly contemplated that active wireless communication technology can be used. In such case, each roller is provided with a wireless communication chip and traces, such as shown in FIG. 9. Active wireless communication allows a single reader to interact at greater ranges. Also, the reader can interact with a plurality of roller wireless communication chips due to the increased range.

Figure 10A:
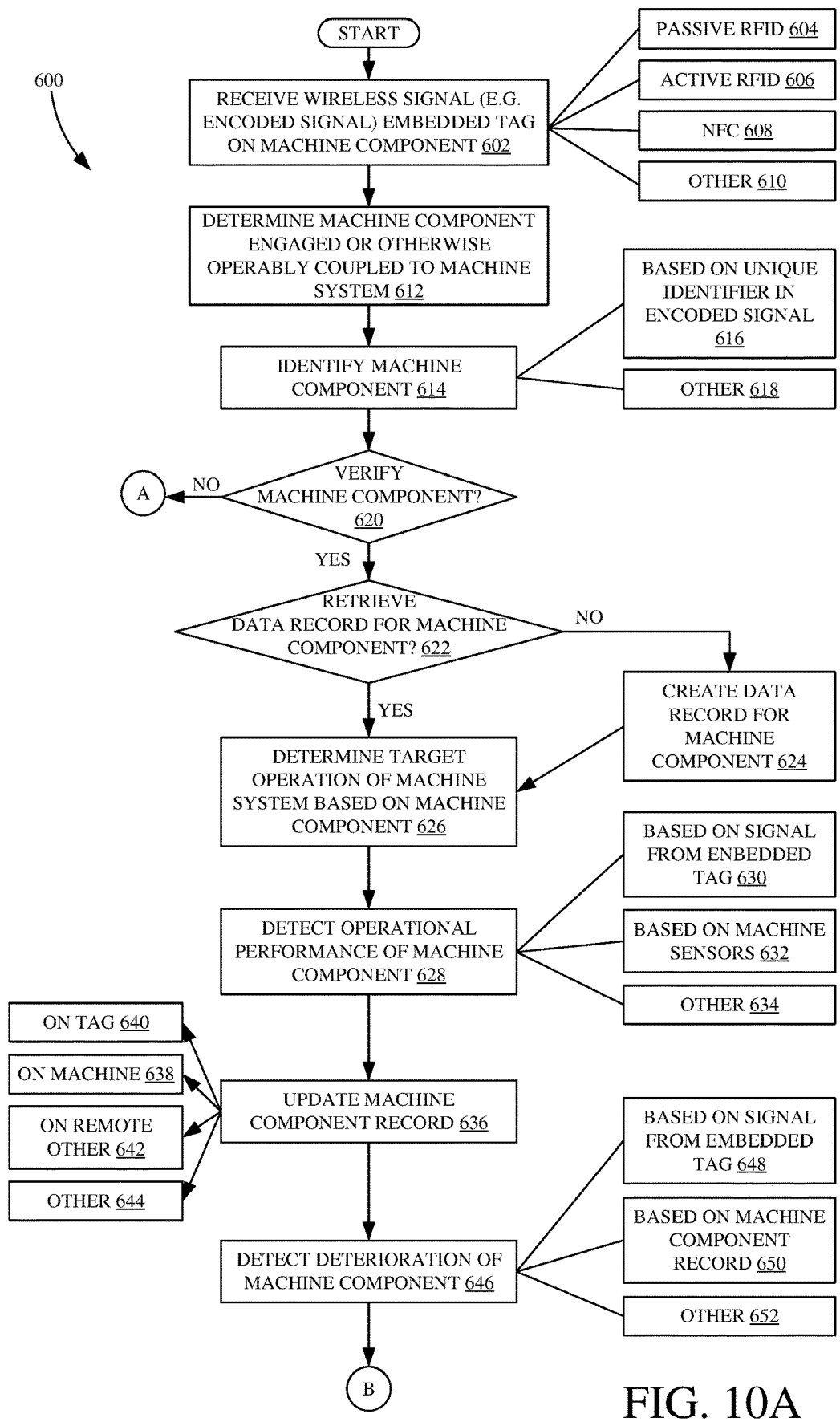
FIGS. 10A and 10B are a flow diagram illustrating an example operation of a wireless machine component detection and processing system.
Figure 10B:
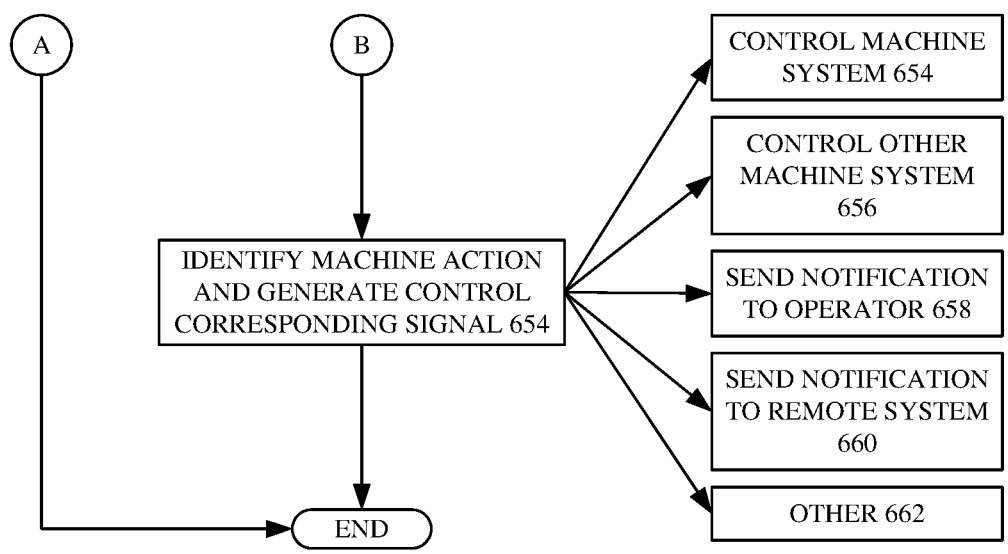

FIGS. 10A and 10B (collectively referred to as FIG. 10) is a flow diagram 600 illustrating one example of the operation for wireless machine component detection and processing. For sake of illustration, but not by limitation, FIG. 10 will be described in the context of system 148 on machine 102, in the form of an agricultural seeder.

At block 602, a wireless signal is received from a tag (embedded or otherwise provided on) a machine component. In one example, the machine component comprises a metering roller for a volumetric meter. The wireless signal, in one example, comprises an encoded signal that is encoded with information that identifies the machine component, either directly or through a mapping stored in a machine component record (e.g., record 340). The wireless signal can be received through any of a variety of types of wireless systems. In one example, the signal is received from a passive RFID tag (block 604), that sends a response to a signal from an RFID reader. In another example, the wireless signal can comprise a signal from an active RFID tag (block 606). In another example, an NFC system is utilized. This is represented by block 608. Of course, the wireless signal can be received using other types of wireless communication systems, channels, and protocols. This is represented by block 610.

At block 612, system 148 determines that the machine component is engaged or otherwise operably coupled to the corresponding machine system. In one example, this determination is based on the signal received at block 602. For example, in the case of a passive RFID tag, the close proximity required for the passive tag activation can indicate that the machine component is properly coupled for operation. In yet another example, a sensor can be utilized to identify the machine component coupling.

At block 614, logic 322 identifies the machine component based on the signal received at block 602. Illustratively, this is based on a unique identifier in the encoded signal. This is represented by block 616. The machine component can be identified in other ways as well. This is represented by block 618.

At block 620, logic 323 verifies the machine component to determine whether to allow operation of the corresponding machine system. As noted above, this verification can limit operation based on a manufacturer, configuration, or other characteristic of the machine component.

Based on the machine component verification, block 622 determines whether a data record of the machine component exists. This can include accessing machine component records 340 to identify a matching record for the identified machine component. For sake of illustration, assume that the unique identifier at block 616 indicates a tag ID of "TAGID01568". Based on this tag identifier, block 622 retrieves the data record 418 which indicates that that particular roller has 86,232 cycles. It can also include other information, such as a manufactured date, and lifecycle data indicating a total number of cycles before which the roller is to be replaced. If no data record is identified for the machine component (e.g., it may be a roller that has not been used before), a new data record can be created in data store 334. This is represented by block 624.

At block 626, a target operation of the machine system can be determined based on the data for the machine component. In the metering roller example mentioned above, a speed of the roller can be set based on the MVD of the machine component identified from the corresponding record 340 and/or from encoded data in the signal from the RFID tag.

At block 628, operational performance of the machine component is detected. The operational performance can indicate any of a variety of performance characteristics. For example, it can indicate a duration of use, a distance, a number of rotations, a load on the component, an operating temperature, structural strain on the component, to name a few.

The operational performance can be detected based on the signal from the embedded tag. This is represented by block 630. For example, based on the signal detected by reader 306, movement and/or a position of the machine component can be detected. Alternatively, or in addition, as noted above the machine component can include sensors such as gyroscope(s), accelerometer(s), inertial measurement units (IMUs), etc. These sensors can be part of the embedded tag, or otherwise positioned on the machine component and communicate with the tag to provide the information.

Also, the operational performance of the machine component can be detected based on machine sensors. This is represented by block 632. For example, position or movement sensors (e.g., sensors 124) can indicate movement, load, temperature, strain, or any other characteristic of the machine component. This operational performance data is associated with the machine component. Of course, the operational performance of the machine component can be detected in other ways as well. This is represented by block 634.

At block 636, the machine component record corresponding to the machine component is updated to reflect the operational performance detected at block 628. The machine component record can be stored on one or more of (or the record can be distributed across) machine 102 (block 638), the tag on the machine component (block 640), and/or a remote system (e.g., system 114) (block 642). Alternatively, or in addition, the machine component record can be stored in other places as well. This is represented by block 644.

At block 646, deterioration or wear of the machine component is detected by logic 328. As noted above, this can be based on the signal received from the embedded tag at block 602. This is represented by block 648. For example, wear of the machine component can result in a change to the signal, indicating that the tag has become damaged, has been destroyed, or is otherwise no longer operating properly.

Alternatively, or addition, the deterioration of the machine component can be detected based on the operational data stored in the machine component record. This is represented by block 650. For instance, logic 328 can determine that a metering roller has exceeded its lifecycle by comparing columns 412 and 414 in FIG. 6. Of course, the deterioration of the machine component can be detected in other ways as well. This is represented by block 652.

At block 654, a machine action is identified based on one or more of the target operations determined at block 626 and the deterioration detected at block 646. For example, a corresponding control signal can be generated based on the identified machine action.

In one example, the control signal controls the machine system corresponding to the machine component. This is represented by block 654. For instance, if block 646 determines that the metering roller has a threshold level of wear, the control signal can control the metering system to cease operation and/or generate a notification for the operator.

Other machine systems can be controlled as well. This is represented by block 656. For instance, if the deterioration at block 646 indicates that a valve, bearing, etc. of steering subsystem 154 has a threshold level of wear, the control signal can control the propulsion subsystem 152 to slow the machine to a target velocity.

Alternatively, or in addition, the control signal can send a notification to operator 108 indicating the detected deterioration, providing a suggested corrective action, etc. This is represented by block 658. Such a notification can be sent to remote system 114 as well. This is represented by block 660. Of course, the machine action and corresponding control signal can be generated in other ways as well. This is represented by block 662.

FIGS. 11-14 illustrate examples of mobile work machine 102 that can use wireless machine component detection and processing system 148.

Figure 11:
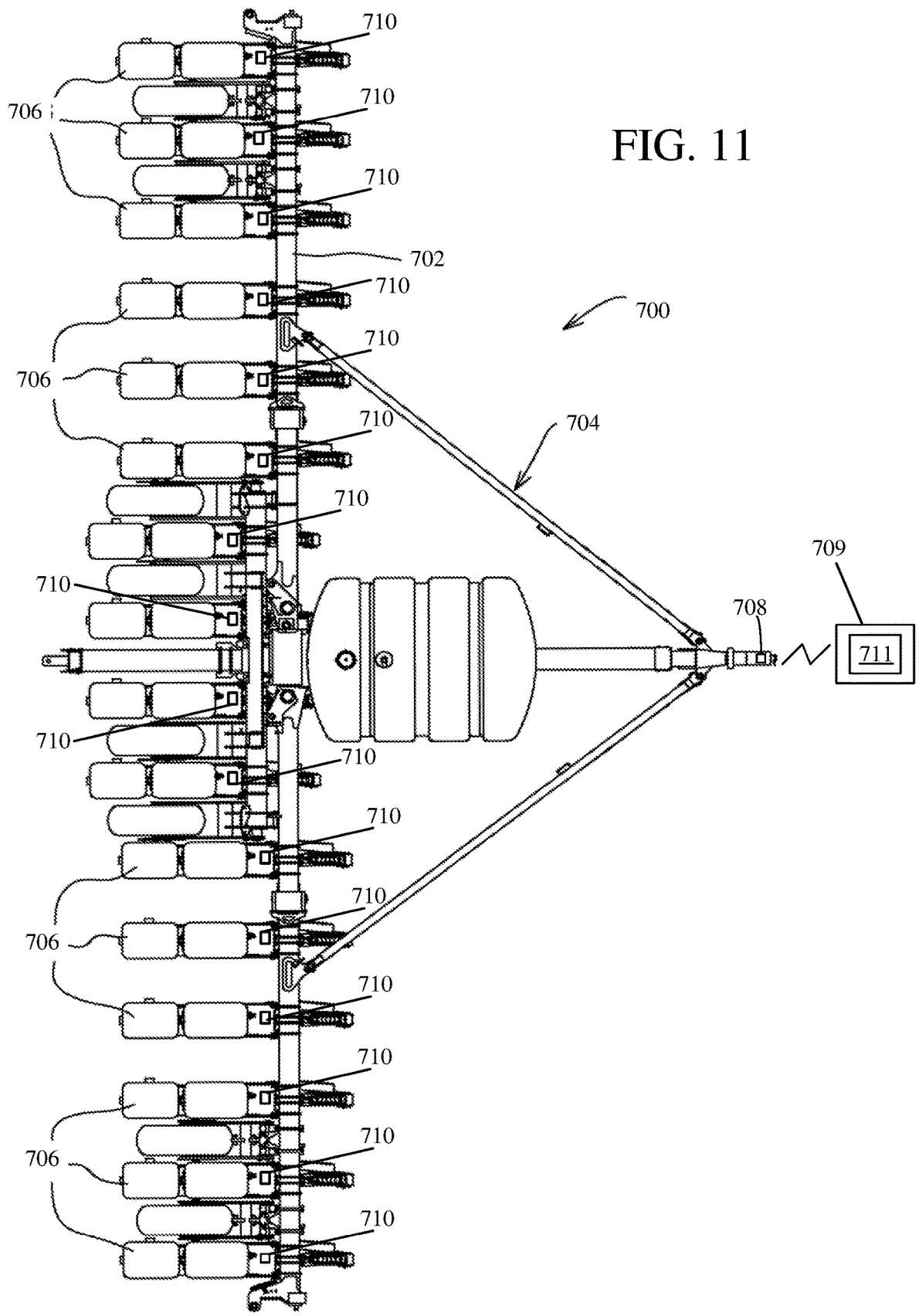
FIG. 11 shows one example of a top view of an agricultural machine.

FIG. 11 is a top view of one example of an agricultural machine 700. Agricultural machine 700 illustratively includes a toolbar 702 that is part of a frame 704. A plurality of row units 706 are mounted to the toolbar. Agricultural machine 700 can be towed behind another machine (generally represented by 709), such as a tractor. In one example, an RFID tag (generally represented by 708) can be placed on frame 704 and read by an RFID reader (generally represented by 711) on the other machine. In this way, system 148 can identify that machine 700 has been coupled to the other machine, and can track and store operational data corresponding to machine 700. RFID tag 708 can also transmit additional information, such as data that identifies the type and/or configuration of row units 706, historical usage data (e.g., hours, acres planted, etc.), recommended settings, lifecycle data, etc. Also, each row unit 706 can include one or more RFID readers, generally represented at 710. Each RFID reader 710 is configured to receive signals from one or more RFID tags on the corresponding row unit.

Figure 12:
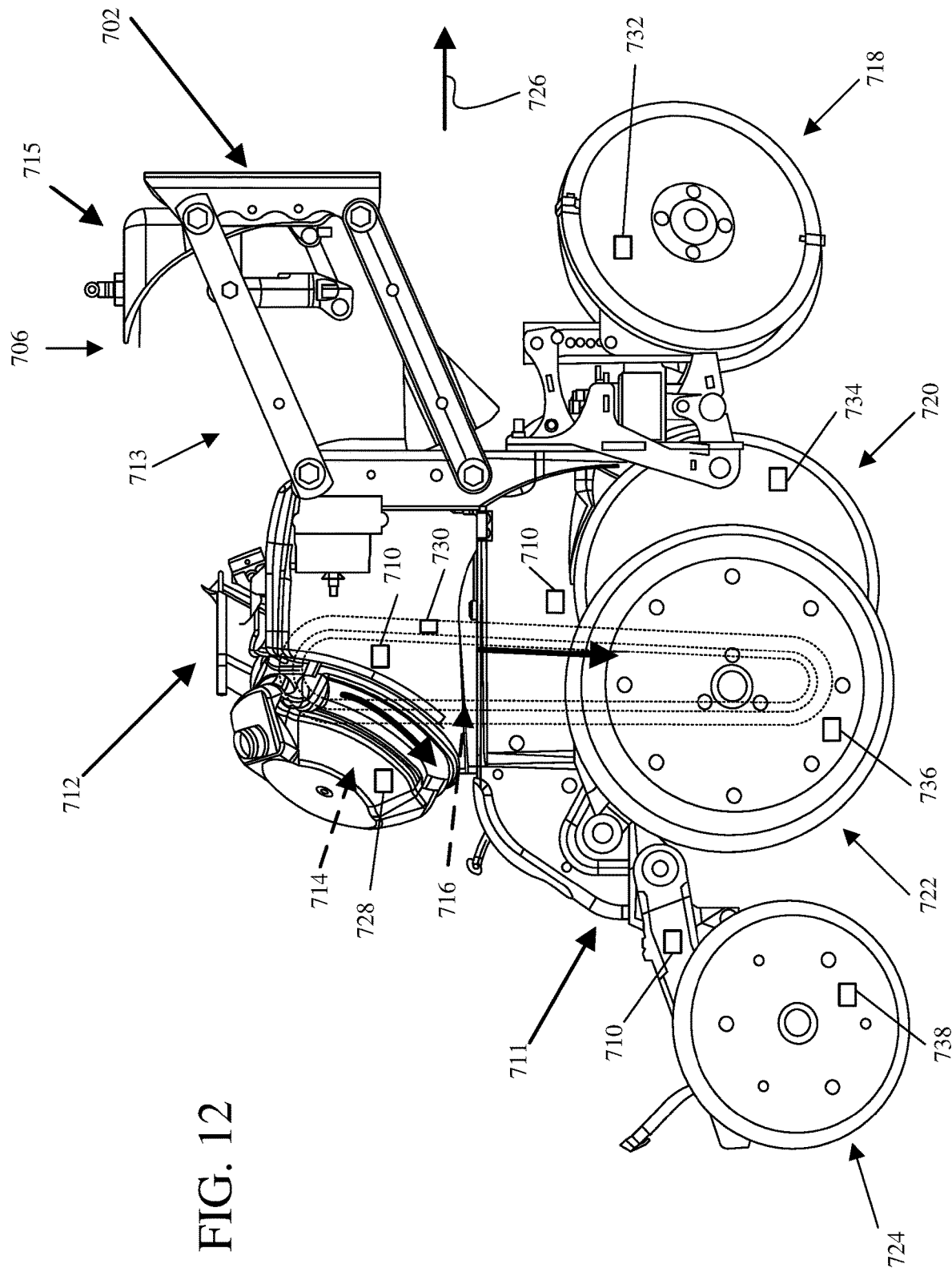
FIG. 12 shows one example of a side view of a row unit of the agricultural machine shown in FIG. 11.

FIG. 12 is a side view showing one example of row unit 706 in more detail. FIG. 12 shows that each row unit 706 illustratively has a frame 711 connected to toolbar 702 by a linkage (shown generally at 713). Linkage 713 is illustratively mounted to toolbar 702 so that it can move upward and downward (relative to toolbar 702).

Row unit 706 also illustratively has a seed hopper 712 that stores seed. The seed is provided from hopper 712 to a seed metering system 714 that meters the seed and provides the metered seed to a seed delivery system 716 that delivers the seed from the seed metering system 714 to the furrow or trench generated by the row unit 706. In one example, seed metering system 714 uses a rotatable member, such as a disc or concave-shaped rotating member. Other types of meters can be used as well.

Row unit 706 can also include a row cleaner 718, a furrow opener 720, a set of gauge wheels 722, and a set of closing wheels 724. In operation, as row unit 706 moves in the direction generally indicated by arrow 726, row cleaner 718 generally cleans the row ahead of the opener 720 to remove plant debris and opener 720 opens a furrow in the soil. Gauge wheels 722 illustratively control a depth of the furrow, and seed is metered by seed metering system 714 and is delivered to the furrow by seed delivery system 716. Closing wheels 724 close the trench over the seed. A downforce generator 715 can also be provided to controllably exert downforce to keep the row unit in desired engagement with the soil.

As noted above, row unit 706 can include one or more RFID readers 710 positioned to wirelessly detect the components of row unit 706. The positioning of RFID reader 710 in FIG. 12 is for sake of illustration only. Any number of readers 710 can be positioned on row unit 706 at various locations depending on the components to be sensed and whether the RFID tags are passive, active, battery assisted, etc.

In the example of FIG. 12, seed metering system 714 includes an RFID tag 728, which can be positioned on the rotating member mentioned above. Also, an RFID tag 730 can be positioned on the seed delivery system 716 (e.g., brush belt). RFID tags can also be positioned on the row cleaner 718, opener 720, gauge wheel 722, and/or closing wheel 724, as represented by reference numerals 732, 734, 736, and 738, respectively.

The RFID tags on those components can be read by the RFID reader(s) 710 and identified and tracked by their unique identifiers. The operational data can also be used for controlling operation of row unit 706. For instance, an RFID tag (e.g., RFID 732 for row cleaner 718, RFID tag 734 for opener 720, RFID tag 722 for gauge wheel 722, RFID tag 738 for closing wheel 724) can be configured to sense rotation, and to provide an indication of that sensed rotation to a wireless machine component detection and processing system (e.g., system 148). Based on that indication, the system determines that the component is not rotating properly, such as by comparing the sensed rotation to a threshold or model of expected rotation. Further, based on determining that the component is not rotating properly, the system can control the machine in any of a variety of ways. For instance, an output device (e.g., display screen, speaker, etc.) can be controlled to output an indication that advises the operator of the condition. In another example, a corrective sequence is recommended to the operator and/or initiated automatically, such as raising and then lowering the row cleaners or row unit to try to clear debris that may be causing the issue. If the corrective sequence does not correct the issue, the operator could be advised to stop the machine and check for jamming situations that might require clearing. In another example, the issue can be caused by the RFID being missing or physically altered. Here, the operator can be alerted to inspect the component for damage (such as excessive opener blade wear) or to determine that the component actually broke off of the machine and needs replacement (such as a gauge wheel or closing wheel.) In another example, the signal from the RFID tag can indicate wear on the corresponding component (e.g., closing wheel 724), and the system can adjust a setting, such as to increase or decrease the down pressure on row unit 706).

Figure 13:
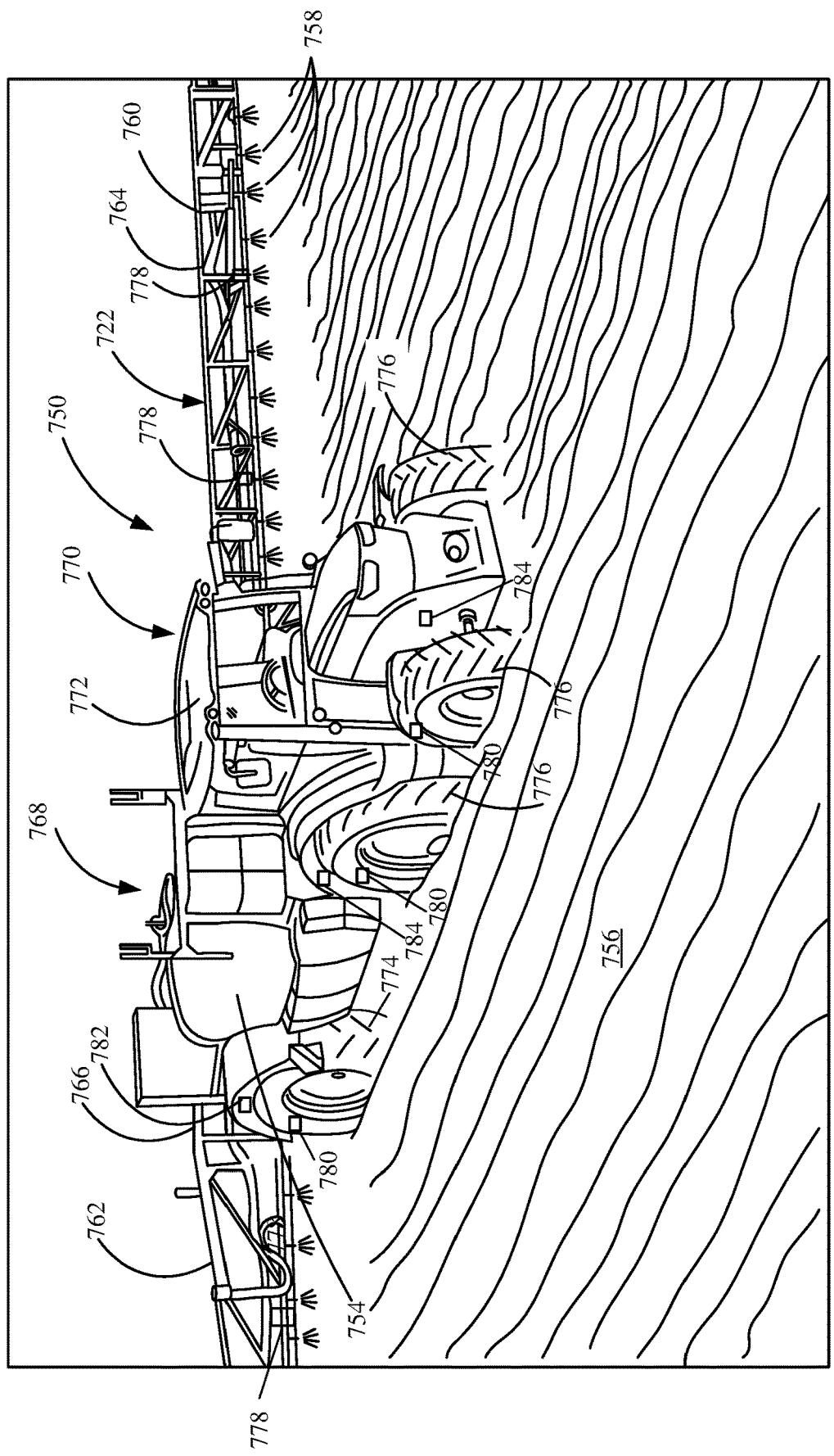
FIG. 13 illustrates an example agricultural sprayer.

FIG. 13 illustrates an agricultural spraying machine 750. Sprayer 750 includes a spraying system 752, having a tank 754 containing a liquid that is to be applied to field 756. Tank 754 is fluidically coupled to spray nozzles 758 by a delivery system comprising a set of conduits. A fluid pump is configured to pump the liquid from tank 754 through nozzles 758. Spray nozzles 758 are coupled to, and spaced apart along, boom 760. Boom 760 includes arms 762 and 764 which can articulate or pivot relative to a center frame 766.

In the example illustrated in FIG. 13, sprayer 750 comprises a towed implement 768 that carries the spraying system, and is towed by a towing or support machine 770 (illustratively a tractor) having an operator compartment or cab 772. Sprayer 750 includes a set of traction elements, such as wheels 774. The towing or support machine 770 also includes traction elements 776. The traction elements can also be tracks, or other traction elements as well. It is noted that in other examples, sprayer 750 is self-propelled. That is, rather than being towed by a towing machine, the machine that carries the spraying system also carries propulsion and steering systems.

In one example, the nozzles include RFID tags (not illustrated in FIG. 13) that is read by RFID readers 778 positioned along boom 760. Thus, when the nozzles 758 are coupled to the spraying system, they are read by the reader 778. The RFID tags transmit nozzle identifying information, such as the nozzle size, usage data, etc. This information can be used to control the spraying system, such as by controlling the speed of the fluid pump. The fluid pump and the associated motors can include RFID tags as well.

In the illustrated example, one or more of the traction elements 774, 776, include RFID tags 780 embedded in the tread. These RFID tags are read by RFID readers 782 positioned on the machine(s).

Figure 14:
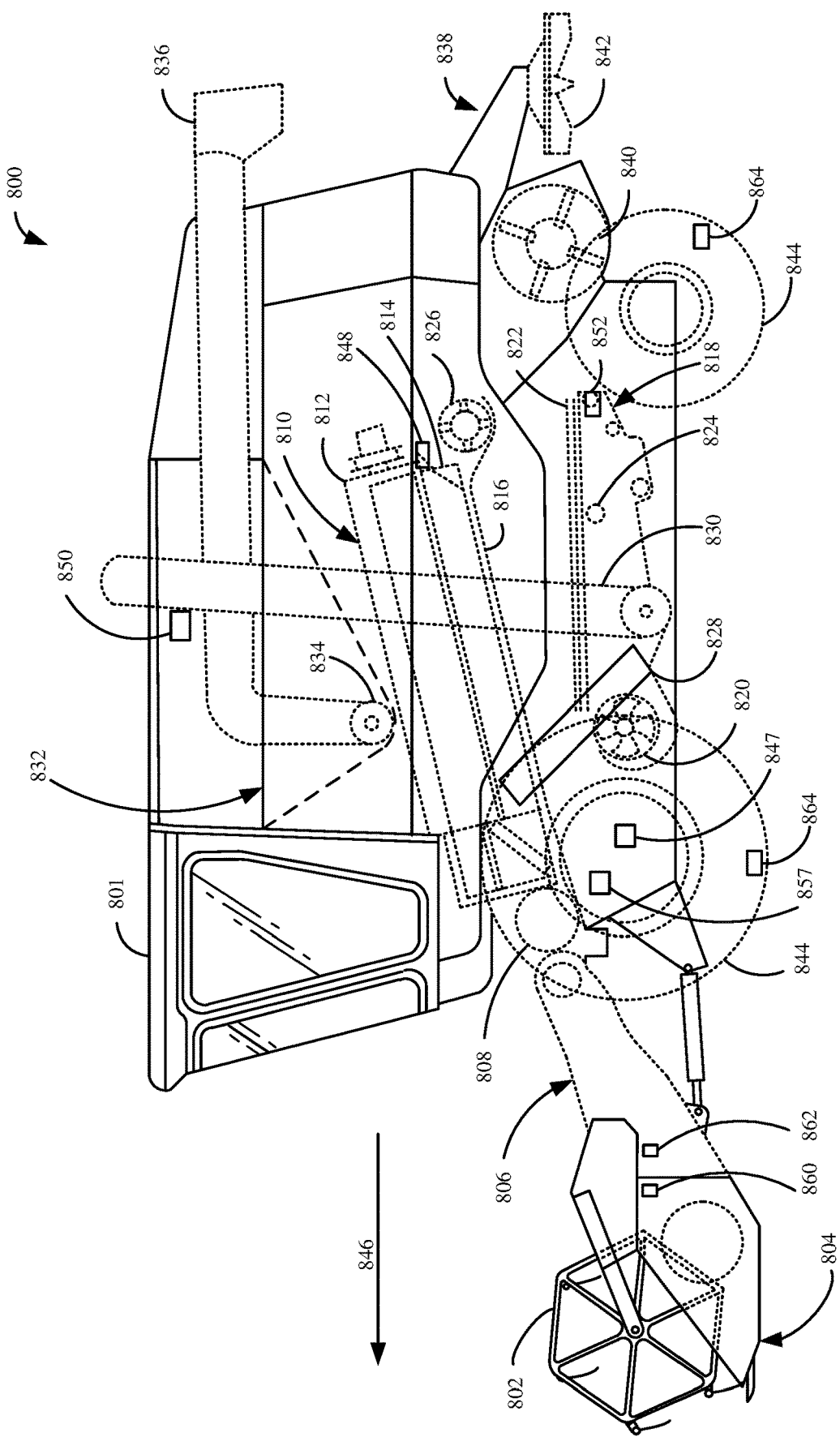
FIG. 14 is a partial pictorial, partial schematic illustration of one example of a mobile work machine in the form of a combine harvester.

FIG. 14 is a partial pictorial, partial schematic, illustration of one of example of an agricultural machine 800, in an example where machine 800 is a combine harvester (or combine). It can be seen in FIG. 14 that combine 800 illustratively includes an operator compartment 801, which can have a variety of different operator interface mechanisms, for controlling combine 800, as will be discussed in more detail below. Combine 800 can include a set of front end equipment that can include header 802, and a cutter generally indicated at 804. It can also include a feeder house 806, a feed accelerator 808, and a thresher generally indicated at 810. Thresher 810 illustratively includes a threshing rotor 812 and a set of concaves 814. Further, combine 800 can include a separator 816 that includes a separator rotor. Combine 800 can include a cleaning subsystem (or cleaning shoe) 818 that, itself, can include a cleaning fan 820, chaffer 822 and sieve 824. The material handling subsystem in combine 800 can include (in addition to a feeder house 806 and feed accelerator 808) discharge beater 826, tailings elevator 828, clean grain elevator 830 (that moves clean grain into clean grain tank 832) as well as unloading auger 834 and spout 836. Combine 800 can further include a residue subsystem 838 that can include chopper 840 and spreader 842. Combine 800 can also have a propulsion subsystem that includes an engine (or other power source) that drives ground engaging wheels 844 or tracks, etc.

In operation, and by way of overview, combine 800 illustratively moves through a field in the direction indicated by arrow 846. As it moves, header 802 engages the crop to be harvested and gathers it toward cutter 804. After it is cut, it is moved through a conveyor in feeder house 806 toward feed accelerator 808, which accelerates the crop into thresher 810. The crop is threshed by rotor 812 rotating the crop against concave 814. The threshed crop is moved by a separator rotor in separator 816 where some of the residue is moved by discharge beater 826 toward the residue subsystem 838. It can be chopped by residue chopper 840 and spread on the field by spreader 842.

Grain falls to cleaning shoe (or cleaning subsystem) 818. Chaffer 822 separates some of the larger material from the grain, and sieve 824 separates some of the finer material from the clean grain. Clean grain falls to an auger in clean grain elevator 830, which moves the clean grain upward and deposits it in clean grain tank 832. Residue can be removed from the cleaning shoe 818 by airflow generated by cleaning fan 820. That residue can also be moved rearwardly in combine 800 toward the residue handling subsystem 838. Tailings can be moved by tailings elevator 828 back to thresher 810 where they can be re-threshed.

FIG. 14 also shows that, in one example, combine 800 can include ground speed sensor 847, one or more separator loss sensors 848, a clean grain camera 850, and one or more cleaning shoe loss sensors 852. Ground speed sensor 847 illustratively senses the travel speed of combine 800 over the ground. This can be done by sensing the speed of rotation of the wheels, the drive shaft, the axel, or other components. The travel speed and position of combine 800 can also be sensed by a positioning system 857, such as a global positioning system (GPS), a dead reckoning system, a LORAN system, or a wide variety of other systems or sensors that provide an indication of travel speed.

In the illustrated example, one or more of the components shown in FIG. 14 can include RFID tags that are read by one or more RFID readers positioned on combine 800. For example, header 802 can include an RFID tag 860 that is read by an RFID reader 862 when header 802 is coupled to combine 800. Thus, operation of header 802, in general, can be tracked, automatically, based on automatic identification of header 802 when it is coupled to combine 800.

Similarly, components of the material handling subsystem can include RFID tags. For instance, this can include the threshing rotor 812, cleaning subsystem 818, etc. Also, the ground engaging elements can include RFID tags, as mentioned above. In the illustrated example, RFID tags 864 are embedded in wheels 844.

It can thus be seen that the present system provides a number of advantages. For example, but not by limitation, a wireless machine component detection and processing system uniquely identifies various machine components, it can identify target operations for those components, and/or it can identify and track instantaneous as well as historical usage of the components. This can be utilized to identify deterioration or wear of the components, to determine when parts require replacement. Further, detection of the machine components can verify proper configuration and/or engagement of the components in their respective systems, as well as to verify that the proper parts have been selected. Further, by correlating the performance to the specific components, usage of the components can be tracked across different operational sessions on a same machine as well as across multiple machines.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors, processing systems, controllers and/or servers. In one example, these can include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 15:
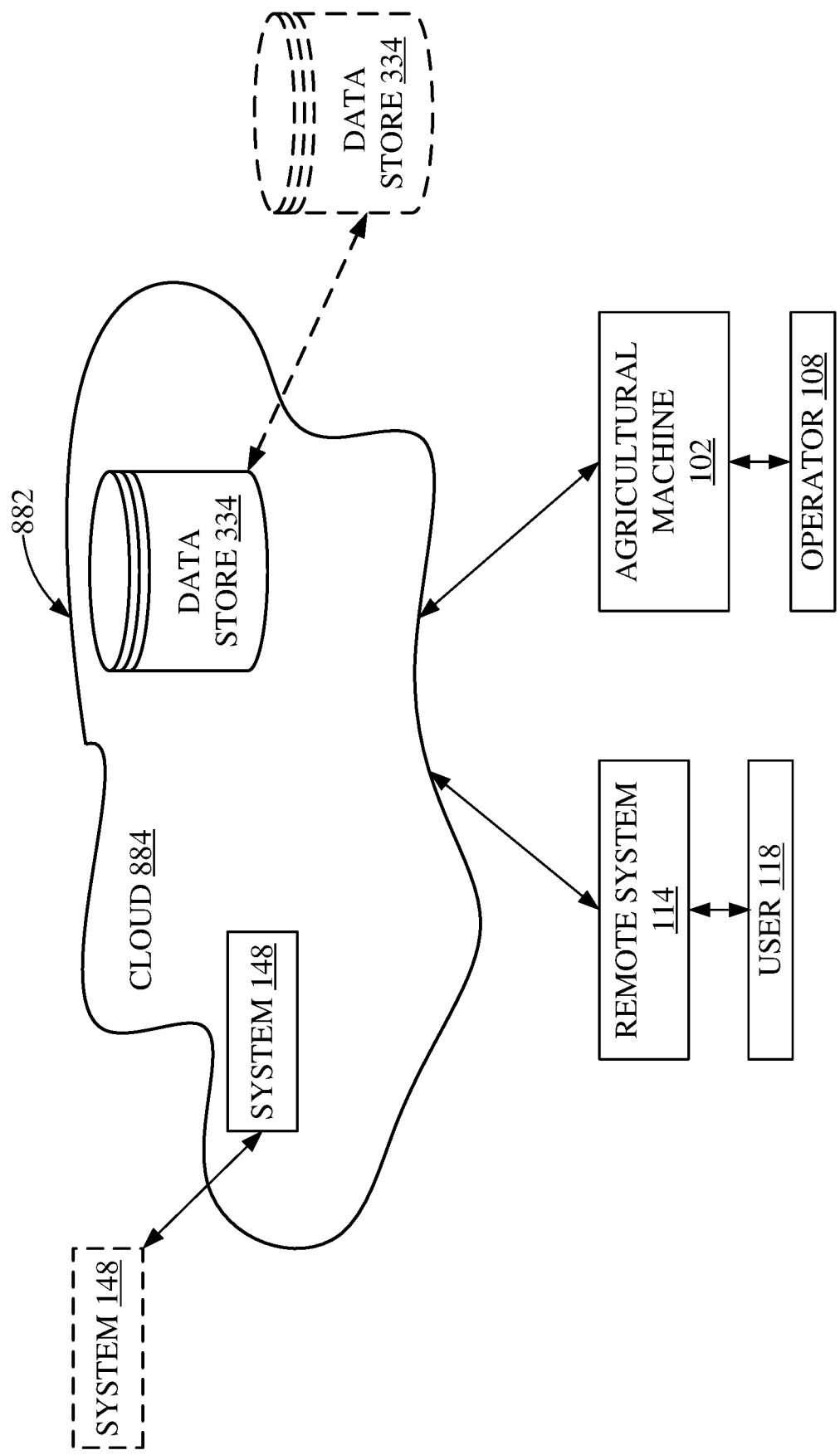
FIG. 15 is a block diagram showing one example of the architecture illustrated in FIG. 1, deployed in a remote server architecture.

FIG. 15 is a block diagram of one example of mobile work machine architecture 100, shown in FIG. 1, where mobile work machine 102 communicates with elements in a remote server architecture 882. In an example, remote server architecture 882 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIG. 1 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 15, some items are similar to those shown in FIG. 1 and they are similarly numbered. FIG. 15 specifically shows that system 148 and/or data store 334 can be located at a remote server location 884. Therefore, mobile work machine 102 accesses those systems through remote server location 884.

FIG. 15 also depicts another example of a remote server architecture. FIG. 15 shows that it is also contemplated that some elements of FIG. 1 are disposed at remote server location 884 while others are not. By way of example, data store 334 can be disposed at a location separate from location 884, and accessed through the remote server at location 884. Alternatively, or in addition, system 148 can be disposed at location(s) separate from location 884, and accessed through the remote server at location 884.

Regardless of where they are located, they can be accessed directly by mobile work machine 102, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the mobile work machine comes close to the fuel truck for fueling, the system automatically collects the information from the machine or transfers information to the machine using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the mobile work machine until the mobile work machine enters a covered location. The mobile work machine, itself, can then send and receive the information to/from the main network.

It will also be noted that the elements of FIG. 1, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 16:
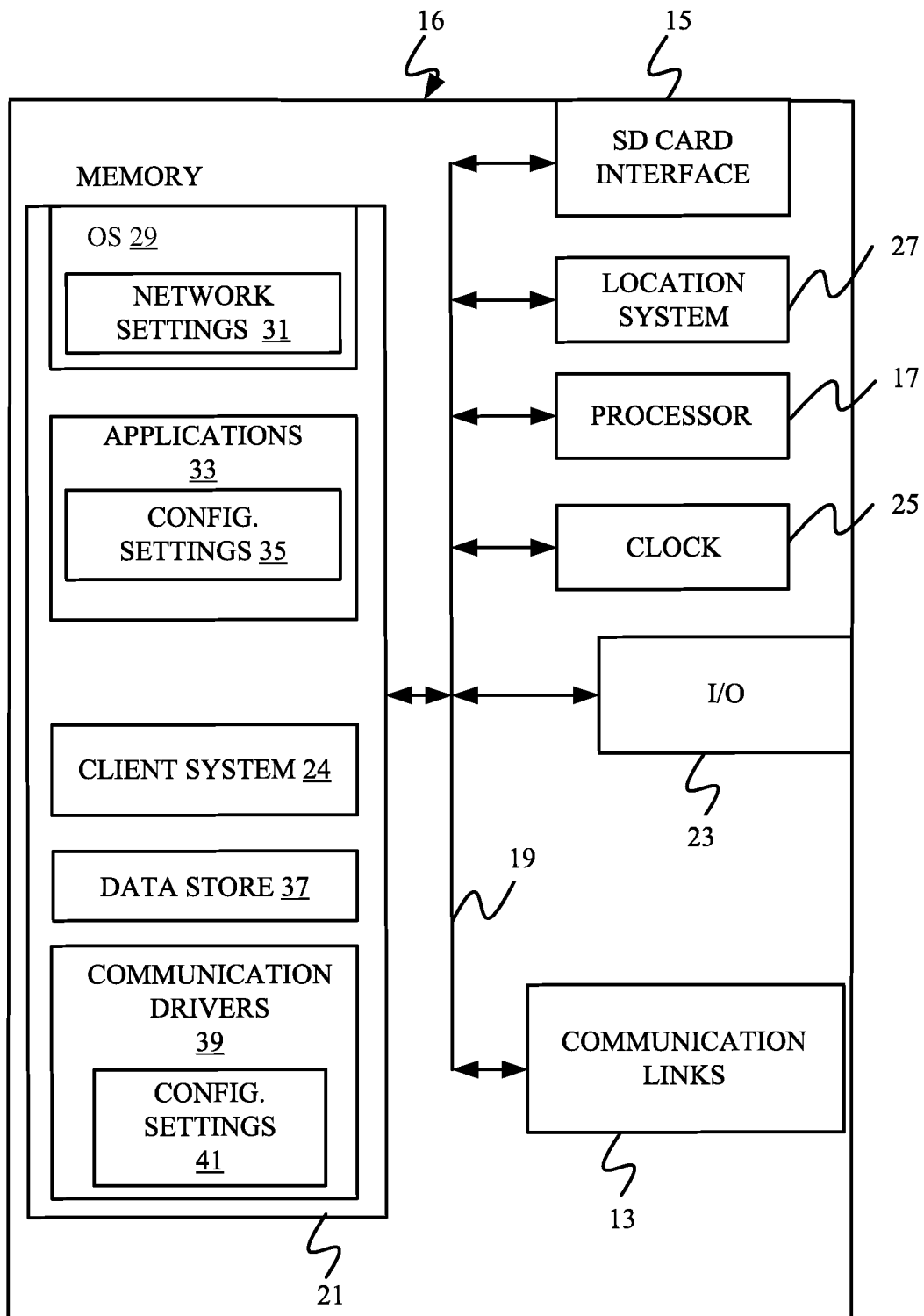
FIGS. 16-18 show examples of mobile devices that can be used in the architectures shown in the previous figures.
Figure 17:
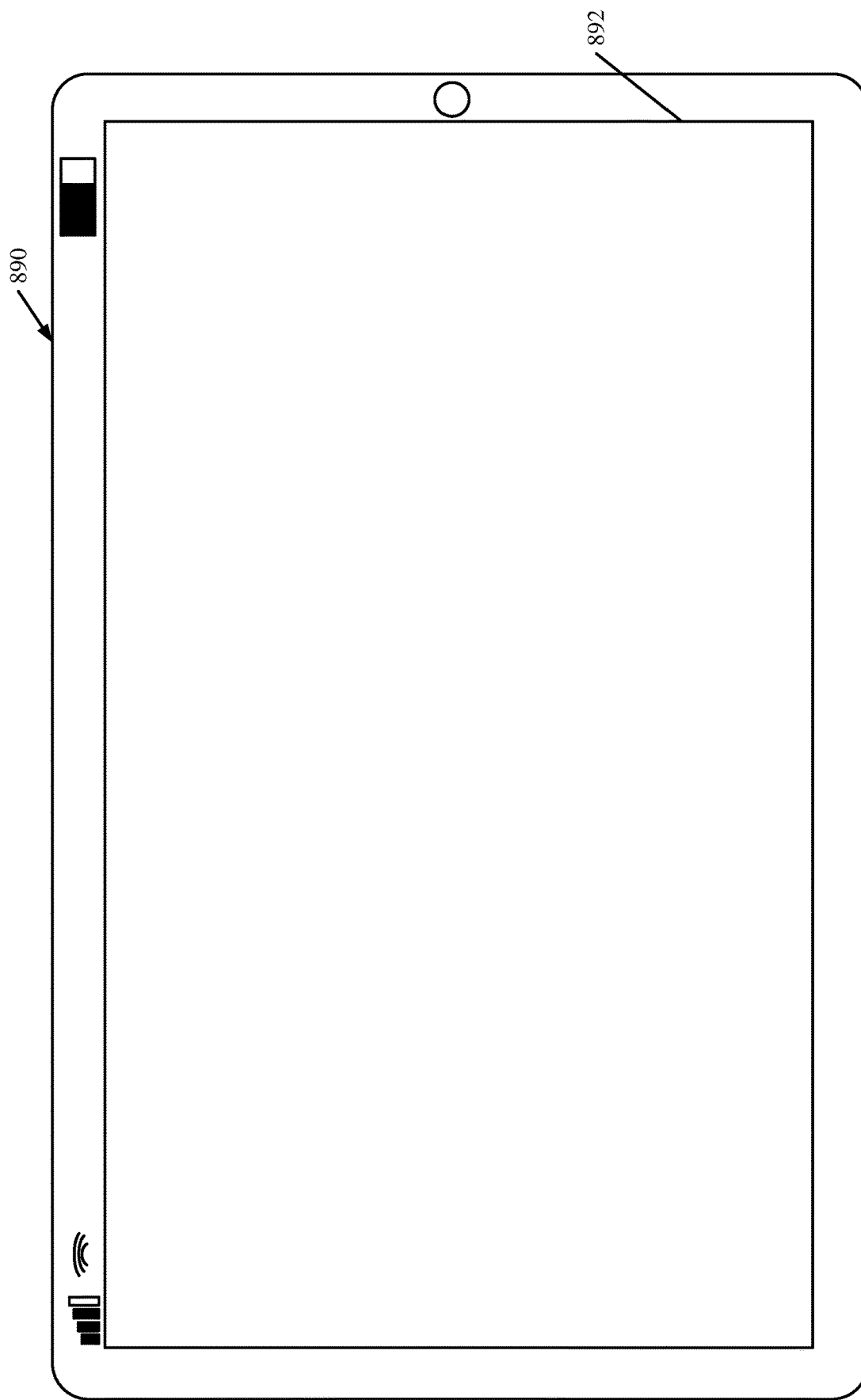
Figure 18:
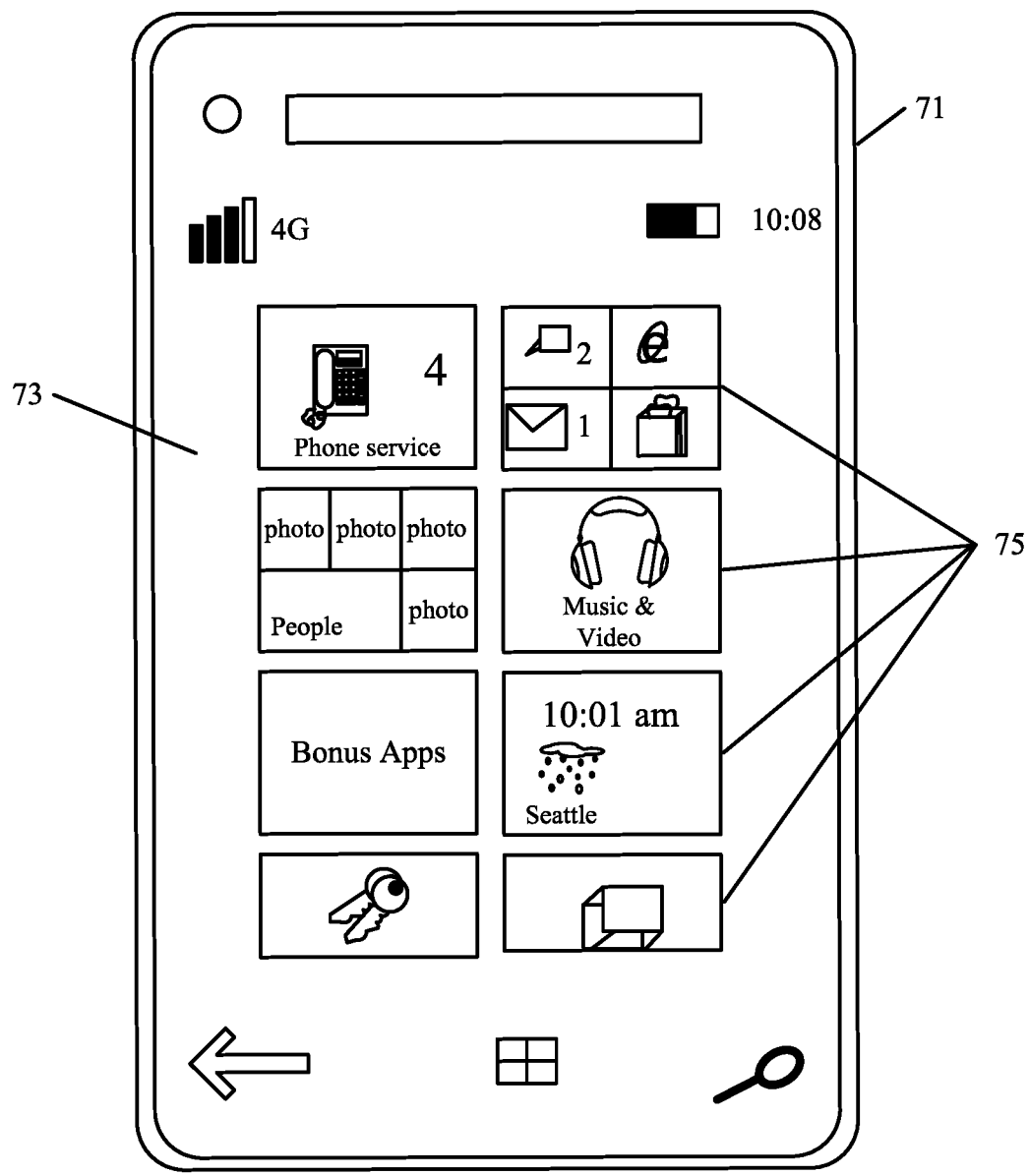

FIG. 16 is a simplified block diagram of one illustrative example of a handheld or mobile computing device that can be used as a user's or client's hand held device 16, in which the present system (or parts of it) can be deployed. For instance, a mobile device can be deployed in the operator compartment of mobile work machine 102 or as remote system 114. FIGS. 17-18 are examples of handheld or mobile devices.

FIG. 16 provides a general block diagram of the components of a client device 16 that can run some components shown in FIG. 4, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous FIGS.) along a bus 19 that is also connected to memory 21 and input/output (I/O) components 23, as well as clock 25 and location system 27.

I/O components 23, in one example, are provided to facilitate input and output operations. VO components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 17 shows one example in which device 16 is a tablet computer 890. In FIG. 17, computer 890 is shown with user interface display screen 892. Screen 892 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 890 can also illustratively receive voice inputs as well.

FIG. 18 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 19:
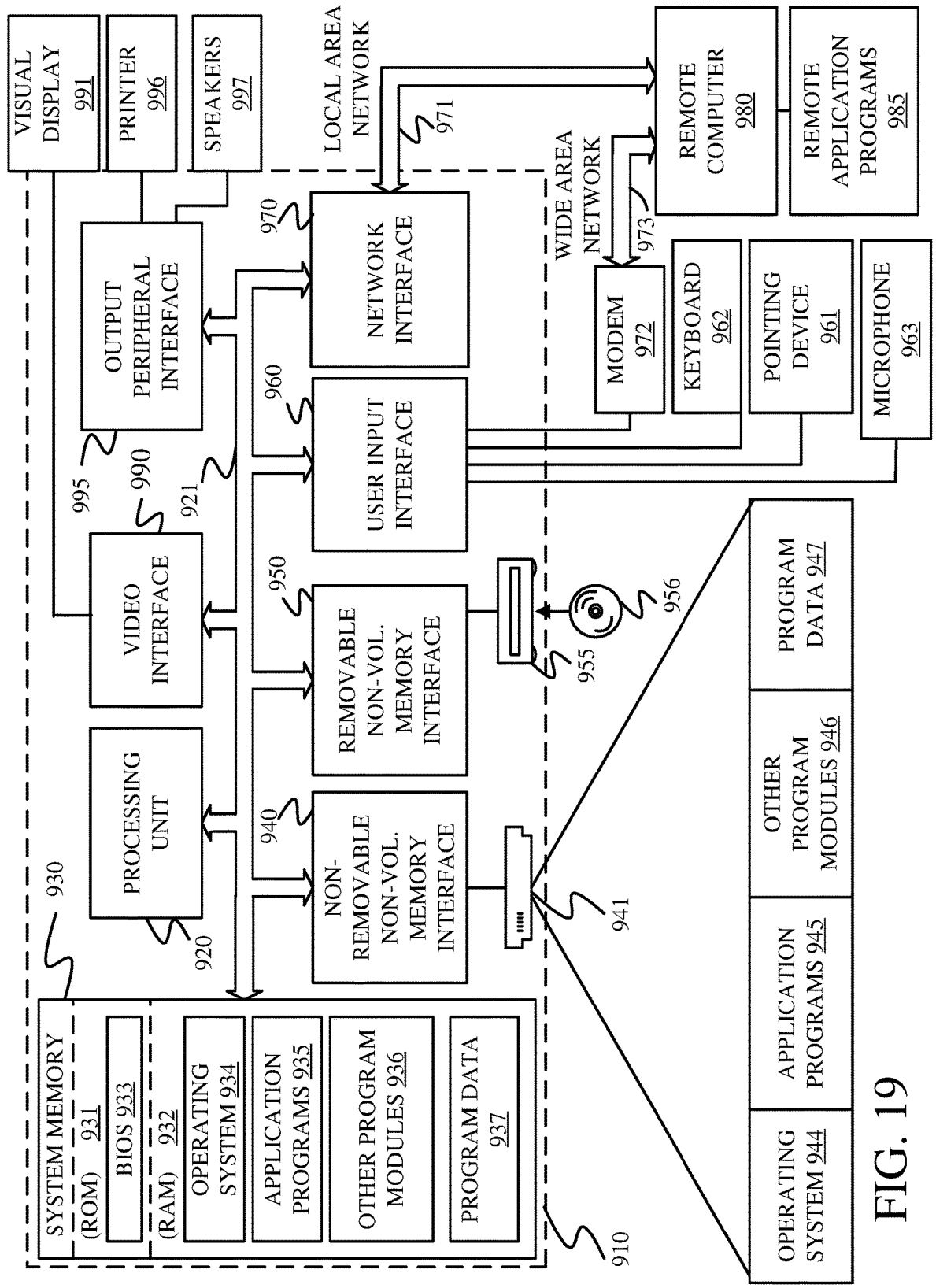
FIG. 19 is a block diagram showing one example of a computing environment that can be used in the architectures shown in the previous figures.

FIG. 19 is one example of a computing environment in which elements of FIG. 1, or parts of it, (for example) can be deployed. With reference to FIG. 19, an example system for implementing some embodiments includes a computing device in the form of a computer 910. Components of computer 910 may include, but are not limited to, a processing unit 920 (which can comprise processors or servers from previous FIGS.), a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. Memory and programs described with respect to FIG. 1 can be deployed in corresponding portions of FIG. 19.

Computer 910 typically includes a variety of computer readable media. Computer readable media can be any available media that can be accessed by computer 910 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 910. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 19 illustrates operating system 934, application programs 935, other program modules 936, and program data 937.

The computer 910 may also include other removable/non-removable volatile/nonvolatile computer storage media. By way of example only, FIG. 19 illustrates a hard disk drive 941 that reads from or writes to non-removable, nonvolatile magnetic media, an optical disk drive 955, and nonvolatile optical disk 956. The hard disk drive 941 is typically connected to the system bus 921 through a non-removable memory interface such as interface 940, and optical disk drive 955 is typically connected to the system bus 921 by a removable memory interface, such as interface 950.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 19, provide storage of computer readable instructions, data structures, program modules and other data for the computer 910. In FIG. 19, for example, hard disk drive 941 is illustrated as storing operating system 944, application programs 945, other program modules 946, and program data 947. Note that these components can either be the same as or different from operating system 934, application programs 935, other program modules 936, and program data 937.

A user may enter commands and information into the computer 910 through input devices such as a keyboard 962, a microphone 963, and a pointing device 961, such as a mouse, trackball or touch pad. Other input devices (not shown) may include a joystick, game pad, satellite dish, scanner, or the like. These and other input devices are often connected to the processing unit 920 through a user input interface 960 that is coupled to the system bus, but may be connected by other interface and bus structures. A visual display 991 or other type of display device is also connected to the system bus 921 via an interface, such as a video interface 990. In addition to the monitor, computers may also include other peripheral output devices such as speakers 997 and printer 996, which may be connected through an output peripheral interface 995.

The computer 910 is operated in a networked environment using logical connections (such as a local area network—LAN, or wide area network—WAN or a controller area network—CAN) to one or more remote computers, such as a remote computer 980.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. In a networked environment, program modules may be stored in a remote memory storage device. FIG. 19 illustrates, for example, that remote application programs 985 can reside on remote computer 980.

It should also be noted that the different examples described herein can be combined in different ways. That is, parts of one or more examples can be combined with parts of one or more other examples. All of this is contemplated herein.

Example 1 is a mobile work machine comprising:

a wireless communication system configured to receive a wireless communication signal from a transmitter corresponding to a machine component on the mobile work machine;

machine component identification logic configured to obtain a machine component identifier, that uniquely identifies the machine component, based on the wireless communication signal;

operation detection logic configured to detect a machine operation associated with the machine component and to generate component performance data correlated to the machine component based on the machine operation; and control signal generator logic configured to generate a control signal that controls the mobile work machine based on the component performance data.

Example 2 is the mobile work machine of any or all previous examples, wherein the mobile work machine comprises an agricultural machine.

Example 3 is the mobile work machine of any or all previous examples, wherein the machine component comprises a metering roller.

Example 4 is the mobile work machine of any or all previous examples, wherein the machine component comprises a part of a set of ground engaging traction elements.

Example 5 is the mobile work machine of any or all previous examples, wherein the wireless communication system comprises a radio frequency identification (RFID) reader that receives a radio signal from an RFID tag on the machine component.

Example 6 is the mobile work machine of any or all previous examples, and further comprising:

target operation logic configured to identify a target machine operation based on the component performance data, wherein the control signal controls the mobile work machine to perform the target machine operation.

Example 7 is the mobile work machine of any or all previous examples, wherein the target machine operation comprises at least one of a target speed or a target position of the machine component.

Example 8 is the mobile work machine of any or all previous examples, wherein the control signal controls the mobile work machine to store, in a data store, historical performance data associated with the machine component.

Example 9 is the mobile work machine of any or all previous examples, wherein the data store is on the machine component.

Example 10 is the mobile work machine of any or all previous examples, and further comprising wear detection logic configured to generate a wear indication metric indicative of wear of the machine component.

Example 11 is the mobile work machine of any or all previous examples, wherein the wear indication metric is generated based on a detected change in the wireless communication signal from the transmitter.

Example 12 is the mobile work machine of any or all previous examples, wherein the wear indication metric is generated based on historical performance data associated with the machine component.

Example 13 is the mobile work machine of any or all previous examples, and further comprising verification logic configured to verify the machine component and to control operation of the mobile work machine based on the verification.

Example 14 is a method performed by an agricultural machine, the method comprising: receiving a wireless communication signal from a transmitter corresponding to a machine component on the mobile work machine;

obtaining a machine component identifier, that uniquely identifies the machine component, based on the wireless communication signal;

detecting a machine operation associated with the machine component;

generating component data correlated to the machine component based on the machine operation; and generating a control signal that controls the mobile work machine based on the component data.

Example 15 is the method of any or all previous examples, wherein the wireless communication signal comprises a radio signal from a radio frequency identification (RFID) tag on the machine component.

Example 16 is the method of any or all previous examples, and further comprising: identifying a target machine operation based on the component data; and controlling the mobile work machine to perform the target machine operation.

Example 17 is the method of any or all previous examples, and further comprising generating a wear indication metric indicative of wear of the identified machine component.

Example 18 is the method of any or all previous examples, wherein the wear indication metric is generated based on at least one of:

a detected change in the wireless communication signal from the transmitter; or historical performance data associated with the machine component.

Example 19 is a mobile work machine comprising:

a wireless communication system configured to receive a wireless communication signal from a transmitter corresponding to a machine component on the mobile work machine;

machine component identification logic configured to obtain a machine component identifier, that uniquely identifies the machine component, based on the wireless communication signal;

operation detection logic configured to detect a machine operation associated with the machine component;

wear detection logic configured to generate a wear indication indicative of wear of the machine component; and control signal generator logic configured to generate a control signal that controls the mobile work machine based on the wear indication.

Example 20 is the mobile work machine of any or all previous examples, wherein the wear indication is generated based on at least one of:

a detected change in the wireless communication signal from the transmitter; or historical performance data associated with the machine component.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An agricultural machine comprising:
a metering roller;
a wireless communication receiver configured to receive a wireless communication signal from a transmitter corresponding to the metering roller;
at least one processor; and
memory storing instructions executable by the at least one processor, wherein the instructions, when executed, cause the agricultural machine to:
obtain a metering roller identifier, that uniquely identities the metering roller, based on the wireless communication signal;
detect a machine operation associated with the metering roller and to generate component performance data correlated to the metering roller based on the machine operation; and
generate a control signal that controls the agricultural machine based on the component performance data.

2. The agricultural machine of claim 1, wherein the wireless communication system comprises a radio frequency identification (RFID) reader that receives a radio signal from an RFID tag on the metering roller.

3. The agricultural machine of claim 1, and further comprising:
target operation logic configured to identify a target machine operation based on the component performance data, wherein the control signal controls the agricultural machine to perform the target machine operation.

4. The agricultural machine of claim 3, wherein the target machine operation comprises at least one of a target speed or a target position of the metering roller.

5. The agricultural machine of claim 1, wherein the control signal controls the agricultural machine to store, in a data store, historical performance data associated with the metering roller.

6. The agricultural machine of claim 5, wherein the data store is on the metering roller.

7. The agricultural machine of claim 1, and further comprising wear detection logic configured to generate a wear indication metric indicative of wear of the metering roller.

8. The agricultural machine of claim 7, wherein the instructions, when executed, cause the agricultural machine to:
detect a change in the wireless communication signal from the transmitter;
determine that the detected change indicates physical damage to the transmitter; and
generate the wear indication metric based on the determination.

9. The agricultural machine of claim 7, wherein the wear indication metric is generated based on historical performance data associated with the metering roller.

10. The agricultural machine of claim 1, and further comprising verification logic configured to verify the metering roller and to control operation of the agricultural machine based on the verification.

11. A method performed by a mobile work machine, the method comprising:
receiving a wireless communication signal from a transmitter ponding to a machine component on the mobile work machine;
obtaining a machine component identifier that uniquely identifies the machine component, based on the wireless communication signal;
detecting a machine operation associated with the machine component;
generating component data correlated to the machine component based on the machine operation;
generating a control signal that controls the mobile work machine based on the component data; and
storing, in a data store on the machine component, historical performance data associated with the machine component.

12. The method of claim 11, wherein the wireless communication signal comprises a radio signal from a radio frequency identification (RFID) tag on the machine component.

13. The method of claim 11, and further comprising:
identifying a target machine operation based on the component data; and
controlling the mobile work machine to perform the target machine operation.

14. The method of claim 11, and further comprising generating a wear indication metric indicative of wear of the identified machine component.

15. The method of claim 14, and further comprising:
detecting a chance in the wireless communication signal from the transmitter;
determining that the detected chance indicates physical damage to the transmitter; and
generating the wear indication metric based on the determination.

16. A mobile work machine comprising:
a wireless communication receiver configured to receive a wireless communication signal from a transmitter corresponding to a machine component on the mobile work machine;
at least one processor; and
memory storing instructions executable by the at least one processor, wherein the
instructions, when executed, cause the mobile work machine to:
machine component identification logic configured to obtain a machine component identifier, that uniquely identifies the machine component, based on the wireless communication signal;
operation detection logic configured to detect a machine operation associated with the machine component;
wear detection logic configured to:
detect a change in the wireless communication signal from the transmitter;
determine that the detected chance indicates physical damage to the transmitter;
generate a wear indication indicative of wear of the machine component based on the determination; and
control signal generator logic configured to generate a control signal that controls the mobile work machine used on the wear indication.

17. The mobile work machine of claim 16, wherein the wear indication is generated based on:

historical performance data associated with the machine component.

\* \* \* \* \*